United States Patent
Shao et al.

(10) Patent No.: US 12,284,679 B2
(45) Date of Patent: Apr. 22, 2025

(54) COMMUNICATIONS METHOD AND APPARATUS

(71) Applicant: Huawei Technologies Co., Ltd., Shenzhen (CN)

(72) Inventors: Hua Shao, Shenzhen (CN); Huang Huang, Chengdu (CN); Mao Yan, Chengdu (CN); Kuandong Gao, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 17/072,969

(22) Filed: Oct. 16, 2020

(65) Prior Publication Data

US 2021/0037576 A1 Feb. 4, 2021

Related U.S. Application Data

(63) Continuation of application No. PCT/CN2019/078675, filed on Mar. 19, 2019.

(30) Foreign Application Priority Data

Apr. 18, 2018 (CN) .......................... 201810350020.X

(51) Int. Cl.
*H04W 74/0833* (2024.01)
*H04L 1/1867* (2023.01)
(Continued)

(52) U.S. Cl.
CPC .......... *H04W 74/0833* (2013.01); *H04L 1/189* (2013.01); *H04L 5/0051* (2013.01);
(Continued)

(58) Field of Classification Search
CPC ............. H04W 74/0833; H04W 52/36; H04W 72/0446; H04W 76/11; H04W 52/48;
(Continued)

(56) References Cited

U.S. PATENT DOCUMENTS

2009/0125774 A1   5/2009  Kim et al.
2016/0360567 A1   12/2016 Wu
(Continued)

FOREIGN PATENT DOCUMENTS

CN       1777084 A      5/2006
CN     102438305 A      5/2012
(Continued)

OTHER PUBLICATIONS

Samsung, "Remaining details on power control during RACH procedure", 3GPP TSG RAN WG1 Meeting #NR Adhoc#3, R1-1715925, Sep. 18-21, 2017, 3 pages, Nagoya, Japan.
(Continued)

*Primary Examiner* — Chirag G Shah
*Assistant Examiner* — Joshua Smith
(74) *Attorney, Agent, or Firm* — Slater Matsil, LLP

(57) ABSTRACT

This application discloses a communications method and apparatus. The method includes: sending, by a terminal device, a first message to a network device, where the first message includes a first random access preamble and first data, and a first redundancy version is used for the first data; and determining, by the terminal device, that the first data fails to be sent, and retransmitting the first data, where a second redundancy version is used for the first data. The corresponding communications apparatus is further disclosed. An incremental redundancy manner is used in a retransmission procedure of random access data.

22 Claims, 14 Drawing Sheets

(51) Int. Cl.
  *H04L 5/00* (2006.01)
  *H04W 52/36* (2009.01)
  *H04W 72/0446* (2023.01)
  *H04W 76/11* (2018.01)
(52) U.S. Cl.
  CPC ....... *H04W 52/36* (2013.01); *H04W 72/0446* (2013.01); *H04W 76/11* (2018.02)
(58) Field of Classification Search
  CPC ...... H04W 74/08; H04L 1/189; H04L 5/0051; H04L 1/1819; H04L 1/1867; H04L 1/1657
  See application file for complete search history.

(56) References Cited

U.S. PATENT DOCUMENTS

| | | | | |
|---|---|---|---|---|
| 2017/0041888 | A1* | 2/2017 | Wu | H04W 74/0833 |
| 2017/0086137 | A1* | 3/2017 | Sun | H04W 72/0473 |
| 2017/0111886 | A1* | 4/2017 | Kim | H04W 48/14 |
| 2018/0279376 | A1* | 9/2018 | Dinan | H04W 74/0833 |
| 2019/0229856 | A1* | 7/2019 | Sano | H04W 72/04 |
| 2019/0327770 | A1* | 10/2019 | Liu | H04W 74/0833 |
| 2020/0022188 | A1* | 1/2020 | Lee | H04W 74/08 |
| 2020/0404711 | A1* | 12/2020 | Zhao | H04W 74/0833 |
| 2021/0289557 | A1* | 9/2021 | Ohara | H04W 74/0833 |

FOREIGN PATENT DOCUMENTS

| | | |
|---|---|---|
| CN | 102548015 A | 7/2012 |
| CN | 104838612 A | 8/2015 |
| CN | 104838717 A | 8/2015 |
| CN | 104981022 A | 10/2015 |
| CN | 107872899 A | 4/2018 |
| EP | 3585112 A1 | 12/2019 |

OTHER PUBLICATIONS

MediaTek Inc., "Power Ramping Control Modelling for beamformed RACH", 3GPP TSG-RAN WG2 Meeting #99, R2-1708043, Aug. 21-25, 2017, 2 pages, Berlin, Germany.

Huawei Technologies, Co., Ltd., "Fast Power Offset Control for E-DCH", TSG RAN WG1#38bis, R1-041154, Sep. 20-24, 2024, 3 pages, Seoul, Korea.

ZTE Corporation et al., "On 2-step RACH procedure in NR", 3GPP TSG RAN WG1 Meeting #87, R1-1611274, Nov. 14-18, 2016, 4 pages, Reno, USA.

MCC Support, "Final Report of 3GPP TSG RAN WG1 #86bis v1.0.0 (Lisbon, Portugal, Oct. 10-14, 2016)", 3GPP TSG RAN WG1 Meeting #87, R1-1611081, Nov. 4-18, 2016, 160 pages, Reno, USA.

NTT Docomo, Inc. (Rapporteur), "RAN WG's progress on NR WI in the February meeting 2018", 3GPP TSG-RAN WG2 #101bis, R2-1804394, Apr. 16-20, 2018, 86 pages, Sanya, China.

Samsung: "Discussion on simplified RACH procedure", 3GPP Draft; R1-1612468,Nov. 13, 2016 (Nov. 13, 2016), XP051176416, 5 pages.

Samsung: "Corrections on PRACH procedure", 3GPP Draft; R1-1801951, Feb. 16, 2018 (Feb. 16, 2018), XP051397096, 12 pages.

"3rd Generation Partnership Project; Technical Specification Group Radio Access Network; NR; User Equipment (UE) radio transmission and reception; Part 1: Range 1 Standalone (Release 15)," 3GPP TS 38.101-1 V15.1.0, Mar. 2018, 71 pages.

"3rd Generation Partnership Project; Technical Specification Group Radio Access Network; NR; User Equipment (UE) radio transmission and reception; Part 2: Range 2 Standalone (Release 15)," 3GPP TS 38.101-2 V15.1.0, Mar. 2018, 46 pages.

"3rd Generation Partnership Project; Technical Specification Group Radio Access Network; NR; User Equipment (UE) radio transmission and reception; Part 3: Range 1 and Range 2 Interworking operation with other radios (Release 15)," 3GPP TS 38.101-3 V15.1.0, Mar. 2018, 78 pages.

"3rd Generation Partnership Project; Technical Specification Group Radio Access Network; NR; Physical layer procedures for control (Release 15)," 3GPP TS 38.213 V15.1.0, Mar. 2018, 77 pages.

3rd Generation Partnership Project; Technical Specification Group Radio Access Network; NR; Medium Access Control (MAC) protocol specification (Release 15), 3GPP TS 38.321 V15.1.0, Mar. 2018, 67 pages.

* cited by examiner

COMMUNICATIONS METHOD AND APPARATUS

CROSS-REFERENCE TO RELATED APPLICATIONS

This application is a continuation of International Application No. PCT/CN2019/078675, filed on Mar. 19, 2019, which claims priority to Chinese Patent Application No. 201810350020.X, filed on Apr. 18, 2018. The disclosures of the aforementioned applications are hereby incorporated by reference in their entireties.

TECHNICAL FIELD

This application relates to the field of communications technologies, and in particular, to a communications method and apparatus.

BACKGROUND

As shown in FIG. 1, in an existing random access procedure, a network device and a terminal device need to undergo four steps (referred to as a 4-step RACH below). The network device broadcasts available random access resources to all terminal devices within a coverage area by using system information. A terminal device in an uplink out-of-synchronization state may select a random access preamble, and send the selected random access preamble on a random access physical channel indicated by the network device. A message for sending the random access preamble is also referred to as a "message 1" (Msg1). After receiving the random access preamble sent by the terminal device, the network device sends, to the terminal device, a random access response (RAR) that is also referred to as a "message 2" (Msg2). The RAR includes information, for example, a network temporary identifier and a timing advance, allocated to the terminal device. Different terminal devices may select a same physical channel to send a same random access preamble. Consequently, the network device cannot distinguish between the different terminal devices. The terminal devices send, to the network device, messages 3 (Msg3) that each may also be referred to as a radio resource control connection request (RRC connection request). The messages 3 each include a terminal device identity (UE-ID) and some specific data. After receiving the messages 3, the network device selects a successfully decoded terminal device, and sends, to the terminal device, a message 4 (Msg4) that is used after random access succeeds and that may also be referred to as a contention resolution message.

Because a terminal device has already carried a permanent/temporary identity, for example, a serving-temporary mobile subscriber identity (S-TMSI) in a long term evolution (LTE) communications system, the foregoing 4-step RACH may be simplified into two steps (referred to as a 2-step RACH below). In the first step, the terminal device may send the message 1 and the message 3 in the 4-step RACH. In the second step, the network device sends the message 2 and the message 4 in the 4-step RACH to the terminal device. Compared with the 4-step RACH, the 2-step RACH can reduce a latency of the random access procedure, but retransmission after a failure is more complex than that in the 4-step RACH. Specifically, in the 2-step RACH, after the message 1 is sent, there may be four cases: 1. Both the message 1 and the message 3 are correctly received by the network device. 2. The message 1 is correctly received by the network device, but the message 3 fails to be received. 3. Both the message 1 and the message 3 fail to be received. 4. The message 1 fails to be received, but the message 3 is successfully received.

For the cases 2 and 3, a proper retransmission policy needs to be designed.

SUMMARY

This application provides a communications method and apparatus, to improve retransmission reliability, and reduce a latency of a random access procedure.

According to an aspect, a communication method is provided, and includes: sending, by a terminal device, a first message to a network device, where the first message includes a first random access preamble and first data, and a first redundancy version is used for the first data; and determining, by the terminal device, that the first data fails to be sent, and retransmitting the first data, where the first data is retransmitted by using a second redundancy version. In this aspect, an incremental redundancy manner is used in a retransmission procedure of random access data, so that data transmission reliability is improved, and a latency of a random access procedure is further reduced.

In a possible implementation, the determining, by the terminal device, that the first data fails to be sent includes: when the terminal device does not receive a response message from the network device within a response message receiving window, determining, by the terminal device, that the first data fails to be sent. In this implementation, if the network device does not send any message to the terminal device, it may be determined that the first data fails to be sent.

In another possible implementation, the determining, by the terminal device, that the first data fails to be sent includes: when the terminal device receives, from the network device, a response message that carries information for indicating that the first data fails, determining that the first data fails to be sent. In this implementation, if the first random access preamble is successfully received but the first data fails, the network device indicates, in the response message, that the first data fails.

In still another possible implementation, the method further includes: when the terminal device does not receive the response message from the network device within the response message receiving window, determining, by the terminal device, that the first random access preamble fails to be sent; and sending, by the terminal device, a second random access preamble to the network device, where the second random access preamble is different from the first random access preamble.

In still another possible implementation, the method further includes: determining, by the terminal device, the second redundancy version.

In still another possible implementation, the determining, by the terminal device, the second redundancy version specifically includes: grouping, by the terminal device, a plurality of random access preambles, where each group includes at least one random access preamble, and each of the at least one random access preamble in the group corresponds to one redundancy version; and using, by the terminal device, a redundancy version corresponding to the second random access preamble as the second redundancy version.

In still another possible implementation, the determining, by the terminal device, the second redundancy version includes: sending, by the terminal device to the network device, information used to identify a redundancy version, where the information used to identify the redundancy version is an initialization sequence of a demodulation reference signal DMRS.

In still another possible implementation, the initialization sequence of the demodulation reference signal DMRS is: $c_{init}=(2^{17}(14\ n_s+1)+RV*2^{11}+cellId)\ mod 2^{31}$, where $n_s$ is a slot index within a system frame/a slot index within a random access configuration periodicity, l is an index of a symbol within one slot, RV represents numbers of different redundancy versions, and cellId represents a cell identity.

In still another possible implementation, the response message includes information about the second redundancy version.

In still another possible implementation, the response message includes at least one of the following information: a time resource and/or a frequency resource, a timing advance, or a terminal temporary identity for retransmitting the first data.

In still another possible implementation, the method further includes: retransmitting, by the terminal device, the first message to the network device, where the first message carries information for indicating the second redundancy version.

Correspondingly, another aspect provides a communications apparatus, to implement the foregoing communication method. For example, the communications apparatus may be a chip (for example, a baseband chip or a communications chip) or a device (for example, a terminal device). The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (instruction) and/or data that are/is necessary for the apparatus. Optionally, the communications apparatus may further include a transceiver, configured to support communication between the apparatus and another network element.

In another possible implementation, the communications apparatus may include a sending unit. The sending unit is configured to implement a sending function in the foregoing method, and the processing unit is configured to implement a processing function in the foregoing method. For example, the sending unit is configured to send a first message to a network device, where the first message includes a first random access preamble and first data, and a first redundancy version is used for the first data; the processing unit is configured to determine that the first data fails to be sent; and the sending unit is further configured to retransmit the first data, where the first data is retransmitted by using a second redundancy version.

When the communications apparatus is a chip, a receiving unit may be an input unit such as an input circuit or an input communications interface, and the sending unit may be an output unit such as an output circuit or an output communications interface. When the communications apparatus is a device, a receiving unit may be a receiver (which may also be referred to as a receiver), and the sending unit may be a transmitter (which may also be referred to as a transmitter).

According to still another aspect, another communication method is provided, and includes: receiving, by a network device, a first message from a terminal device, where the first message includes a first random access preamble and first data, and a first redundancy version is used for the first data; demodulating, by the network device, the first message; sending, by the network device, a response message when the first data fails to be demodulated, where the response message carries information for indicating that the first data fails; receiving, by the network device, the first data retransmitted by the terminal device, where a second redundancy version is used for the retransmitted first data; and performing, by the network device, chase combining on the first data in the first message and the retransmitted first data. In this aspect, an incremental redundancy manner is used in a retransmission procedure of random access data, so that data transmission reliability is improved, and a latency of a random access procedure is further reduced.

In a possible implementation, the response message includes information about the second redundancy version.

In another possible implementation, the response message includes at least one of the following information: a time resource and/or a frequency resource, a timing advance, or a terminal temporary identity for retransmitting the first data.

Correspondingly, still another aspect provides a communications apparatus, to implement the foregoing communication method. For example, the communications apparatus may be a chip (such as a baseband chip or a communications chip) or a device (such as a network device or a baseband processing board). The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (instruction) and/or data that are/is necessary for the apparatus. Optionally, the communications apparatus may further include a transceiver, configured to support communication between the apparatus and another network element.

In another possible implementation, the communications apparatus may include a receiving unit, a sending unit, and a processing unit. The receiving unit and the sending unit are respectively configured to implement receiving and sending functions in the foregoing method, and the processing unit is configured to implement a processing function in the foregoing manner. For example, the receiving unit is configured to receive a first message from a terminal device, where the first message includes a first random access preamble and first data, and a first redundancy version is used for the first data; the processing unit is configured to demodulate the first message; the sending unit is configured to send a response message when the first data fails to be demodulated, where the response message carries information for indicating that the first data fails; the receiving unit is further configured to receive the first data retransmitted by the terminal device, where a second redundancy version is used for the retransmitted first data; and the processing unit is further configured to perform chase combining on the first data in the first message and the retransmitted first data.

When the communications apparatus is a chip, the receiving unit may be an input unit such as an input circuit or a communications interface, and the sending unit may be an output unit such as an output circuit or a communications interface. When the communications apparatus is a device, the receiving unit may be a receiver (which may also be referred to as a receiver), and the sending unit may be a transmitter (which may also be referred to as a transmitter).

According to still another aspect, another communication method is provided, and includes: receiving, by a network device, a first message from a terminal device, where the first message includes a first random access preamble and first data, and a first redundancy version is used for the first data; demodulating, by the network device, the first message; skipping, by the network device when the first message fails to be demodulated, sending any message to the terminal device; receiving, by the network device, the first message retransmitted by the terminal device, where a second redundancy version is used for the first data in the retransmitted first message; and performing, by the network device, chase combining on the first data in the first message and the retransmitted first data. In this aspect, an incremental redundancy manner is used in a retransmission procedure of random access data, so that data transmission reliability is improved, and a latency of a random access procedure is further reduced.

Correspondingly, still another aspect provides a communications apparatus, to implement the foregoing communication method. For example, the communications apparatus may be a chip (such as a baseband chip or a communications chip) or a device (such as a network device or a baseband processing board). The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (instruction) and/or data that are/is necessary for the apparatus. Optionally, the communications apparatus may further include a transceiver, configured to support communication between the apparatus and another network element.

In another possible implementation, the communications apparatus may include a receiving unit and a processing unit. The receiving unit and the processing unit are respectively configured to implement receiving and processing functions in the foregoing method. For example, the receiving unit is configured to receive a first message from a terminal device, where the first message includes a first random access preamble and first data, and a first redundancy version is used for the first data; the processing unit is configured to demodulate the first message; the processing unit is further configured to skip, when the first message fails to be demodulated, sending any message to the terminal device; the receiving unit is further configured to receive the first message retransmitted by the terminal device, where a second redundancy version is used for the first data in the retransmitted first message; and the processing unit is further configured to perform chase combining on the first data in the first message and the retransmitted first data.

When the communications apparatus is a chip, the receiving unit may be an input unit such as an input circuit or a communications interface, and a sending unit may be an output unit such as an output circuit or a communications interface. When the communications apparatus is a device, the receiving unit may be a receiver (which may also be referred to as a receiver), and a sending unit may be a transmitter (which may also be referred to as a transmitter).

According to still another aspect, still another communication method is provided, and includes: sending, by a terminal device, a first random access preamble to a network device at a first initial transmit power, and sending first data to the network device at a second initial transmit power, where the first initial transmit power is greater than or equal to the second initial transmit power; and retransmitting, by the terminal device, the first random access preamble at a first retransmission transmit power, and/or retransmitting the first data at a second retransmission transmit power, where the first retransmission transmit power is a sum of the first initial transmit power and a first power ramping amount, the second retransmission transmit power is a sum of the second initial transmit power and a second power ramping amount, the first power ramping amount is a product of a first power ramping step and a first quantity of times of power ramping, the second power ramping amount is a product of a second power ramping step and a second quantity of times of power ramping, and the first power ramping step is greater than or equal to the second power ramping step. In this aspect, the power at which the first random access preamble is retransmitted and/or the power at which the first data is retransmitted are/is ramped up, so that retransmission reliability of the first random access preamble and/or the first data is improved, and a latency of a random access procedure is further reduced.

In a possible implementation, the method further includes: receiving, by the terminal device from the network device, information for indicating a maximum quantity of transmissions and/or a maximum quantity of times of power ramping.

Correspondingly, another aspect provides a communications apparatus, to implement the foregoing communication method. For example, the communications apparatus may be a chip (for example, a baseband chip or a communications chip) or a device (for example, a terminal device). The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (instruction) and/or data that are/is necessary for the apparatus. Optionally, the communications apparatus may further include a transceiver, configured to support communication between the apparatus and another network element.

In another possible implementation, the communications apparatus may include a sending unit. The sending unit is configured to implement a sending function in the foregoing method, and the processing unit is configured to implement a processing function in the foregoing method. For example, the sending unit is configured to: send a first random access preamble to a network device at a first initial transmit power, and send first data to the network device at a second initial transmit power, where the first initial transmit power is greater than or equal to the second initial transmit power; and the sending unit is further configured to retransmit the first random access preamble at a first retransmission transmit power, and/or retransmit the first data at a second retransmission transmit power.

When the communications apparatus is a chip, a receiving unit may be an input unit such as an input circuit or an input communications interface, and the sending unit may be an output unit such as an output circuit or an output communications interface. When the communications apparatus is a device, a receiving unit may be a receiver (which may also be referred to as a receiver), and the sending unit may be a transmitter (which may also be referred to as a transmitter).

According to still another aspect, another communication method is provided, and includes: receiving, by a network device, a first random access preamble sent by a terminal device at a first initial transmit power and first data sent by the terminal device at a second initial transmit power, where the first initial transmit power is greater than or equal to the second initial transmit power; demodulating, by the network device, the first random access preamble and the first data; if the first random access preamble fails to be demodulated and the first data fails to be demodulated, skipping, by the network device, sending a response message to the terminal device; and receiving, by the network device, the first random access preamble retransmitted by the terminal device at a first retransmission transmit power and the first data retransmitted by the terminal device at a second retransmission transmit power, where the first retransmission transmit power is a sum of the first initial transmit power and a first power ramping amount, the second retransmission transmit power is a sum of the second initial transmit power and a second power ramping amount, the first power ramping amount is a product of a first power ramping step and a first quantity of times of power ramping, the second power ramping amount is a product of a second power ramping step and a second quantity of times of power ramping, and the first power ramping step is greater than or equal to the second power ramping step. In this aspect, the power at which the first random access preamble is retransmitted and/or the power at which the first data is retransmitted are/is ramped up, so that retransmission reliability of the first random access preamble and/or the first data is improved, and a latency of a random access procedure is further reduced.

In a possible implementation, the method further includes: sending, by the network device to the terminal device, information for indicating a maximum quantity of transmissions and/or a maximum quantity of times of power ramping.

Correspondingly, still another aspect provides a communications apparatus, to implement the foregoing communication method. For example, the communications apparatus may be a chip (such as a baseband chip or a communications chip) or a device (such as a network device or a baseband processing board). The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (instruction) and/or data that are/is necessary for the apparatus. Optionally, the communications apparatus may further include a transceiver, configured to support communication between the apparatus and another network element.

In another possible implementation, the communications apparatus may include a receiving unit and a processing unit. The receiving unit and the processing unit are respectively configured to implement receiving and processing functions in the foregoing method. For example, the receiving unit is configured to receive a first random access preamble sent by a terminal device at a first initial transmit power and first data sent by the terminal device at a second initial transmit power, where the first initial transmit power is greater than or equal to the second initial transmit power; the processing unit is configured to demodulate the first random access preamble and the first data; the processing unit is further configured to: if the first random access preamble fails to be demodulated and the first data fails to be demodulated, skip sending a response message to the terminal device; and the receiving unit is further configured to receive the first random access preamble retransmitted by the terminal device at a first retransmission transmit power and the first data retransmitted by the terminal device at a second retransmission transmit power.

When the communications apparatus is a chip, the receiving unit may be an input unit such as an input circuit or a communications interface, and a sending unit may be an output unit such as an output circuit or a communications interface. When the communications apparatus is a device, the receiving unit may be a receiver (which may also be referred to as a receiver), and a sending unit may be a transmitter (which may also be referred to as a transmitter).

According to still another aspect, another communication method is provided, and includes: receiving, by a network device, a first random access preamble sent by a terminal device at a first initial transmit power and first data sent by the terminal device at a second initial transmit power, where the first initial transmit power is greater than or equal to the second initial transmit power; demodulating, by the network device, the first random access preamble and the first data; sending, by the network device, a response message to the terminal device if the first random access preamble is successfully demodulated and the first data fails to be demodulated; and receiving, by the network device, the first data retransmitted by the terminal device at a second retransmission transmit power, where the second retransmission transmit power is a sum of the second initial transmit power and a second power ramping amount, and the second power ramping amount is a product of a second power ramping step and a second quantity of times of power ramping. In this aspect, the power at which the first random access preamble is retransmitted and/or the power at which the first data is retransmitted are/is ramped up, so that retransmission reliability of the first random access preamble and/or the first data is improved, and a latency of a random access procedure is further reduced.

In a possible implementation, the method further includes: sending, by the network device to the terminal device, information for indicating a maximum quantity of transmissions and/or a maximum quantity of times of power ramping.

Correspondingly, still another aspect provides a communications apparatus, to implement the foregoing communication method. For example, the communications apparatus may be a chip (such as a baseband chip or a communications chip) or a device (such as a network device or a baseband processing board). The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (instruction) and/or data that are/is necessary for the apparatus. Optionally, the communications apparatus may further include a transceiver, configured to support communication between the apparatus and another network element.

In another possible implementation, the communications apparatus may include a receiving unit, a processing unit, and a sending unit. The receiving unit, the processing unit, and the sending unit are respectively configured to implement receiving, processing, and sending functions in the foregoing method. For example, the receiving unit is configured to receive a first random access preamble sent by a terminal device at a first initial transmit power and first data sent by the terminal device at a second initial transmit power, where the first initial transmit power is greater than or equal to the second initial transmit power; the processing unit is configured to demodulate the first random access preamble and the first data; the sending unit is configured to send a response message to the terminal device if the first random access preamble is successfully demodulated and the first data fails to be demodulated; and the receiving unit is further configured to receive the first data retransmitted by the terminal device at a second retransmission transmit power.

When the communications apparatus is a chip, the receiving unit may be an input unit such as an input circuit or a communications interface, and the sending unit may be an output unit such as an output circuit or a communications interface. When the communications apparatus is a device, the receiving unit may be a receiver (which may also be referred to as a receiver), and the sending unit may be a transmitter (which may also be referred to as a transmitter).

According to still another aspect, a computer-readable storage medium is provided. The computer-readable storage medium stores an instruction. When the instruction is run on a computer, the computer is enabled to perform the methods according to the foregoing aspects.

According to still another aspect, a computer program product including an instruction is provided. When the computer program product runs on a computer, the computer is enabled to perform the methods according to the foregoing aspects.

BRIEF DESCRIPTION OF THE DRAWINGS

To describe the technical solutions in the embodiments of this application or in the background more clearly, the following describes the accompanying drawings for describing the embodiments of this application or the background.

DETAILED DESCRIPTION OF ILLUSTRATIVE EMBODIMENTS

Figure 1:
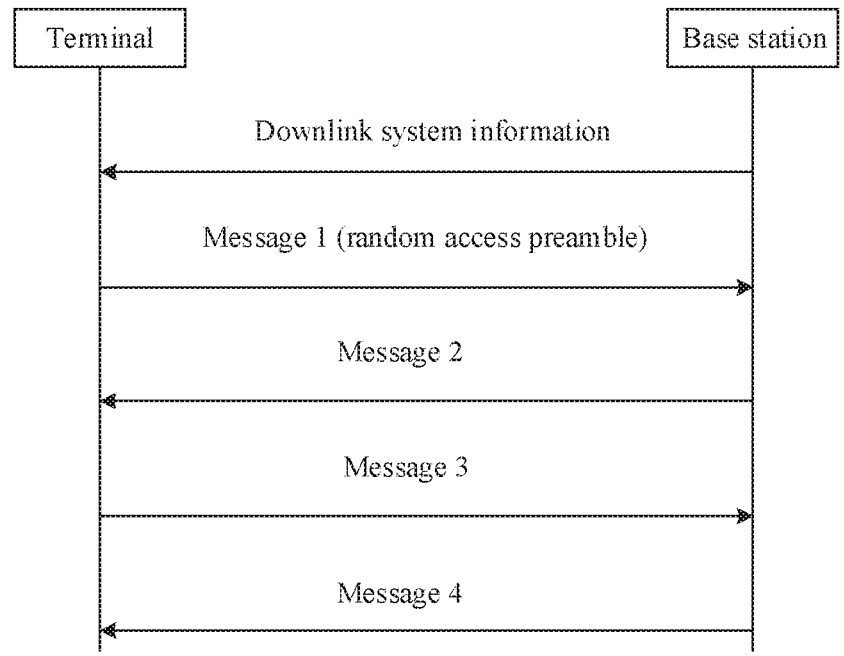
FIG. 1 is a schematic diagram of an existing random access procedure.

For ease of understanding, each message in a 4-step RACH in FIG. 1 is first described in detail.

Msg1: A terminal device sends a request to a network device, where the request is used to initiate random access, the request may be referred to as a random access request message, a message 1, a random access preamble, or another user-defined name, and this is not limited herein. The terminal device sends the message 1 to the network device, where the message 1 includes a random access preamble. In LTE, each cell includes 64 random access preambles, and the terminal device may select any random access preamble.

Msg2: The network device sends a response to the terminal device, where the response is used to respond to the random access request, and may be referred to as a random access response message (RAR), a message 2, or another user-defined name, and this is not limited herein. Specifically, after sending the random access preamble, the terminal device detects, on a corresponding physical downlink control channel (PDCCH), whether there is downlink control information (DCI) corresponding to a cyclic redundancy check (CRC) scrambled by using a random access-radio network temporary identifier (RA-RNTI). The DCI is used to indicate information such as a time-frequency location of a RAR transmitted on a physical downlink shared channel (PDSCH). The terminal device reads a corresponding RAR based on a location indicated by using detected DCI. One message 2 may include RARs for a plurality of terminal devices. Each RAR includes information such as a timing advance, an uplink transmission grant, and a temporary identity for one terminal device.

Msg3: The terminal device sends a message 3 to the network device to perform contention resolution. The message 3 includes a terminal identity and some specific data. The terminal identity may be a 48-bit random number, or may be an S-TMSI of the terminal device. The some specific data is specifically determined based on a trigger condition of a random procedure. For example, the specific data may be a system information (SI) request, a radio resource control (RRC) connection request, or a data scheduling request.

Msg4: After receiving the message 3, the network device indicates, in a message 4, a terminal device that wins the contention resolution. An unsuccessful terminal device retransmits the message 1, and performs a random access procedure again.

Both a 2-step random access procedure (2-step RACH procedure) and 2-step random access (2-step RACH) in this application represent a same meaning, and may also be referred to as other names such as simplified random access (simplified RACH) and flexible random access (flexible RACH). A name is not limited in this application.

A specific procedure of the 2-step RACH is as follows: The terminal device first sends a first random access preamble (namely, the "message 1" in the 4-step RACH) and first data (namely, the "message 3" in the 4-step RACH). The first random access preamble and the first data may be adjacent/interleaved in terms of time and/or frequency, or there may be an interval between the first random access preamble and the first data in terms of time and/or frequency. After receiving the first random access preamble and/or the first data, the network device responds with the message 2 and/or the message 4 in the 4-step RACH.

In this application, the first random access preamble and the first data that are sent by the terminal device in the 2-step RACH may be collectively referred to as a first message. The first random access preamble may be referred to as a preamble part of the first message, and the first data may be referred to as a data part of the first message. The response messages (namely, the "message 2" and the "message 4" in the 4-step RACH) sent by the network device in the 2-step RACH may be collectively referred to as a second message.

Chase combining means that a received erroneous data packet is stored in a buffer, and is combined with a retransmitted data packet that is subsequently received, to obtain a data packet more reliable than that obtained through separate decoding. A hybrid automatic repeat request (HARQ) is used as an example. Depending on whether bit information during retransmission is the same as that during original transmission, implementations of the HARQ include two types: chase combining (CC) and incremental redundancy (IR). In the IR, bit information during each retransmission does not need to be the same as that during initial transmission. On the contrary, a plurality of coded bit sets are generated, and each set carries same information. When retransmission is required, a coded bit set different from a previous one is usually transmitted, and a receive end combines retransmitted data and previously transmitted data. A coded data bit set during each retransmission is referred to as a redundancy version (RV). A redundancy version number represents a start location of each coded bit set.

The following describes the embodiments of this application with reference to the accompanying drawings in the embodiments of this application.

Figure 2:
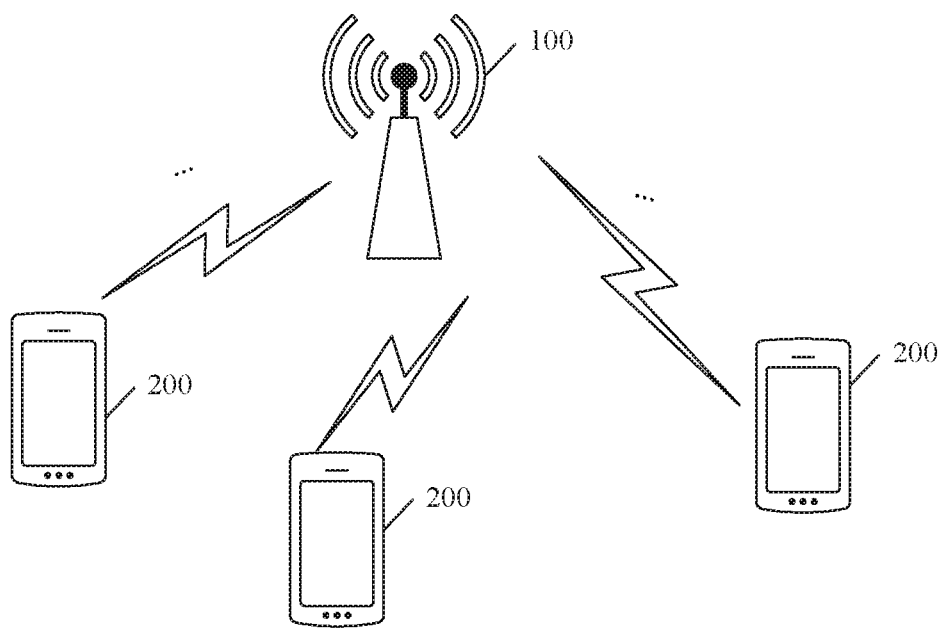
FIG. 2 is a schematic diagram of a communications system to which an embodiment of this application is applicable.

FIG. 2 is a schematic diagram of a communications system to which an embodiment of this application is applicable. The communications system may include at least one network device 100 (only one is shown) and one or more terminal devices 200 connected to the network device 100.

The network device 100 may be any device having a wireless transceiver function, and includes but is not limited to a base station (for example, a NodeB, an evolved NodeB, eNodeB, a base station in a fifth generation (5G) communications system, a base station or a network device in a future communications system, an access node in a Wi-Fi system, a wireless relay node, a wireless backhaul node), or the like. Alternatively, the network device 100 may be a radio controller in a cloud radio access network (CRAN) scenario. Alternatively, the network device 100 may be a gNB in a 5G network or a network device in a future evolved network, or may be a wearable device, a vehicle-mounted device, or the like. Alternatively, the network device 100 may be a small cell, a transmission node (transmission reference point, TRP), or the like. Definitely, this application is not limited thereto.

The terminal device 200 is device having a wireless transceiver function, and may be deployed on land, where the deployment includes indoor, outdoor, handheld, wearable, or vehicle-mounted deployment, may be deployed on water (for example, on a ship), or may be deployed in air (for example, on an aerocraft, a balloon, and a satellite). The terminal device may be a mobile phone, a tablet (pad), a computer having a wireless transceiver function, a virtual reality (VR) terminal device, an augmented reality (AR) terminal device, a wireless terminal in industrial control, a wireless terminal in self driving (self-driving), a wireless terminal in a telemedicine (remote medical), a wireless terminal in a smart grid, a wireless terminal in transportation safety, a wireless terminal in a smart city, a wireless terminal in a smart home, and the like. An application scenario is not limited in the embodiments of this application. Sometimes, the terminal device may also be referred to as user equipment (UE), an access terminal device, a UE unit, a UE station, a mobile station, a mobile station, a remote station, a remote terminal device, a mobile device, a UE terminal device, a terminal device, a wireless communications device, a UE agent, a UE apparatus, or the like.

It should be noted that, terms "system" and "network" in the embodiments of this application may be used interchangeably. "A plurality of" means two or more. In view of this, "a physical of" may also be understood as "at least two" in the embodiments of this application. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

The embodiments of this application provide a communication method and a communications apparatus, and an incremental redundancy manner is used in a retransmission procedure of random access data, so that data transmission reliability is improved, and a latency of a random access procedure is further reduced.

Figure 3A:
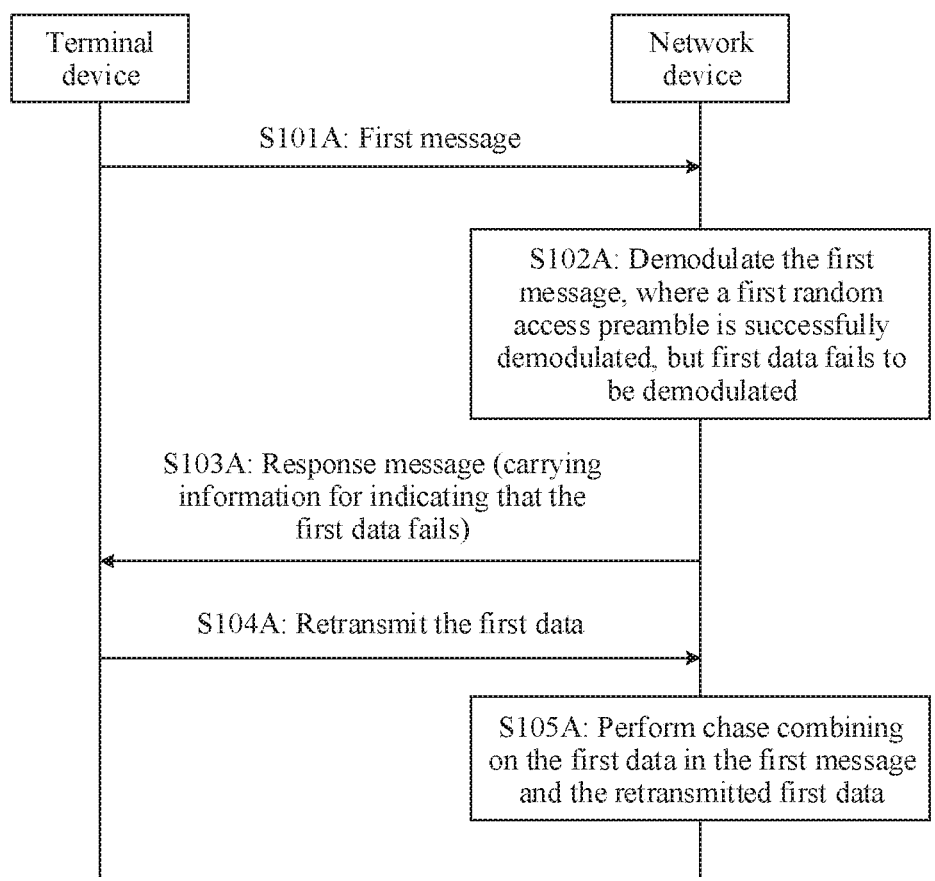
FIG. 3A is a schematic interaction flowchart of a communication method according to an embodiment of this application.

FIG. 3A is a schematic interaction flowchart of a communication method according to an embodiment of this application. The method may include the following steps.

S101A: A terminal device sends a first message to a network device, where the first message includes a first random access preamble and first data, and a first redundancy version is used for the first data. The network device receives the first message from the terminal device.

S102A: The network device demodulates the first message, where the first random access preamble is successfully received, but the first data fails to be demodulated.

In this application, successful demodulation means that the network device successfully restores useful information from the received first message, or may be expressed as that the network device successfully receives the first message. From a perspective of the terminal device, the successful demodulation may alternatively be understood as that the terminal device successfully sends the first message. If the first message is not successfully received or demodulated by the network device, it may be understood as that the terminal device fails to send the first message.

S103A: The network device sends a response message to the terminal device, where the response message carries information for indicating that the first data fails.

S104A: When receiving the response message, the terminal device determines that the first data fails to be sent, and the terminal device retransmits the first data, where the first data is retransmitted by using a second redundancy version. The network device receives the first data retransmitted by the terminal device.

S105A: The network device performs chase combining on the first data in the first message and the retransmitted first data.

This embodiment describes a random access procedure that is when the first random access preamble is successfully sent but the first data fails to be sent.

Figure 4A:
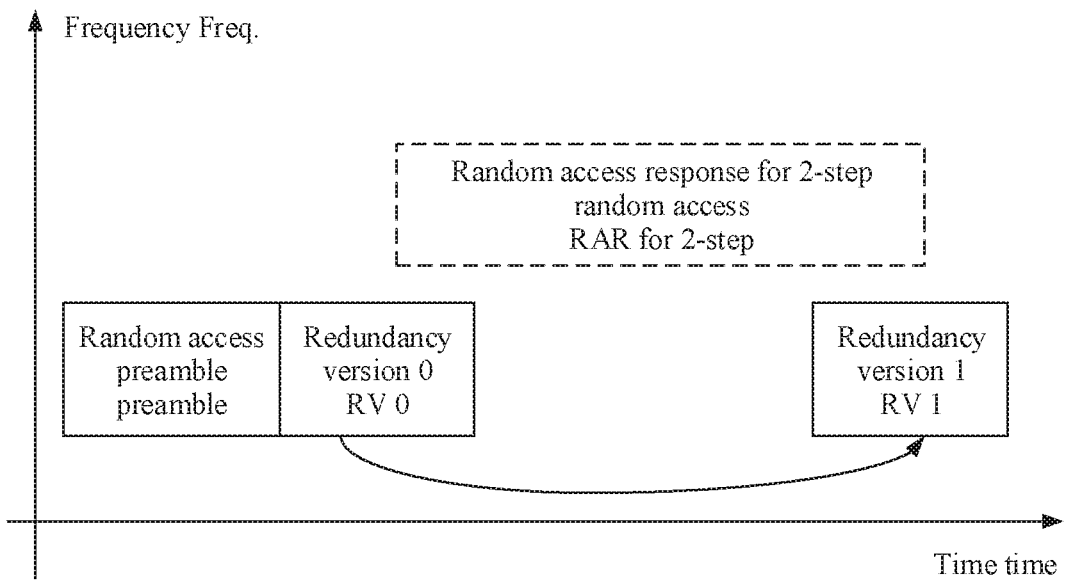
FIG. 4A is a schematic diagram in which a terminal device does not receive a 2-step RAR in a RAR window.
Figure 6A:
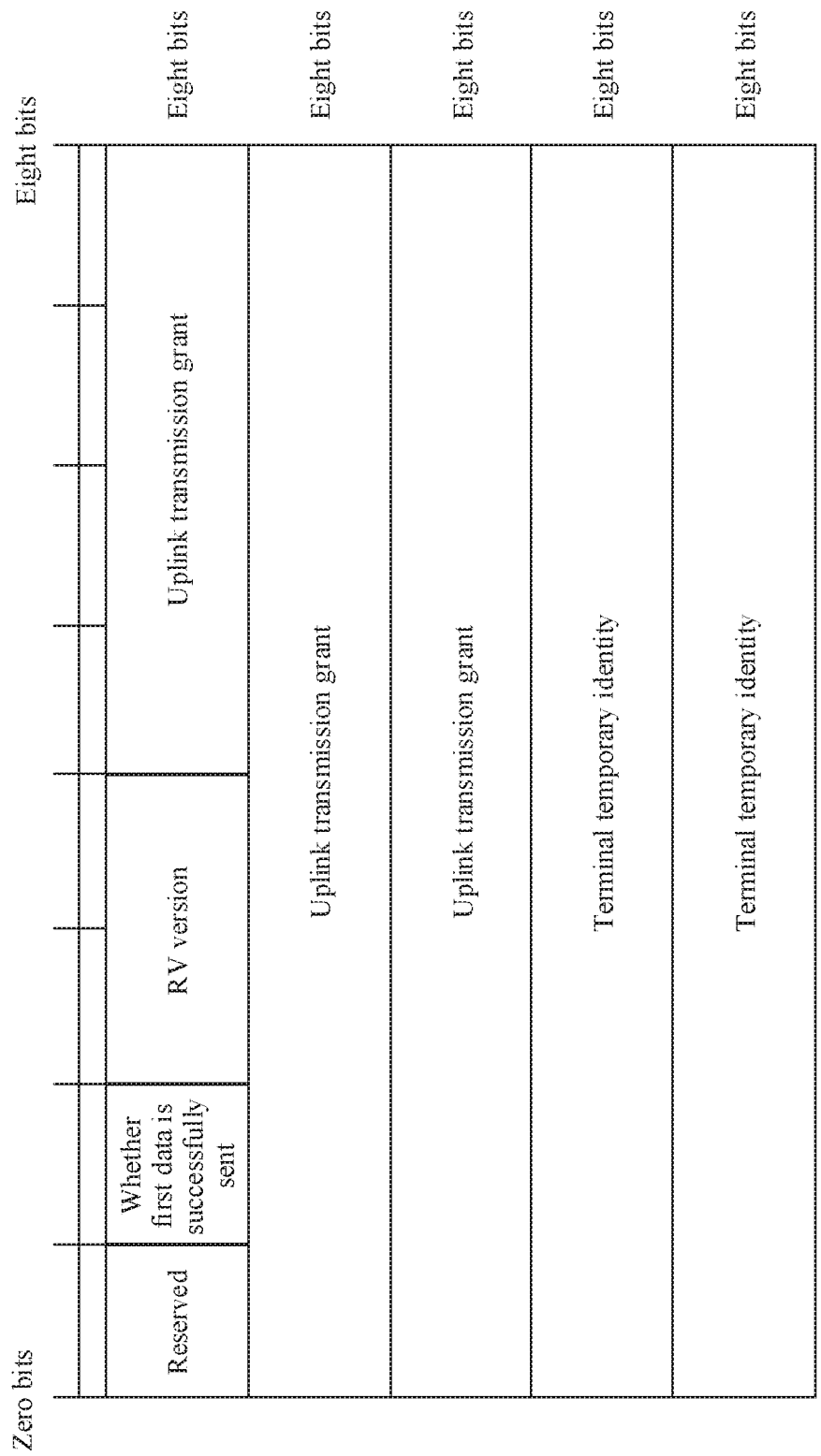
FIG. 6A and FIG. 6B are schematic diagrams of two formats of a 2-step RAR.
Figure 6B:
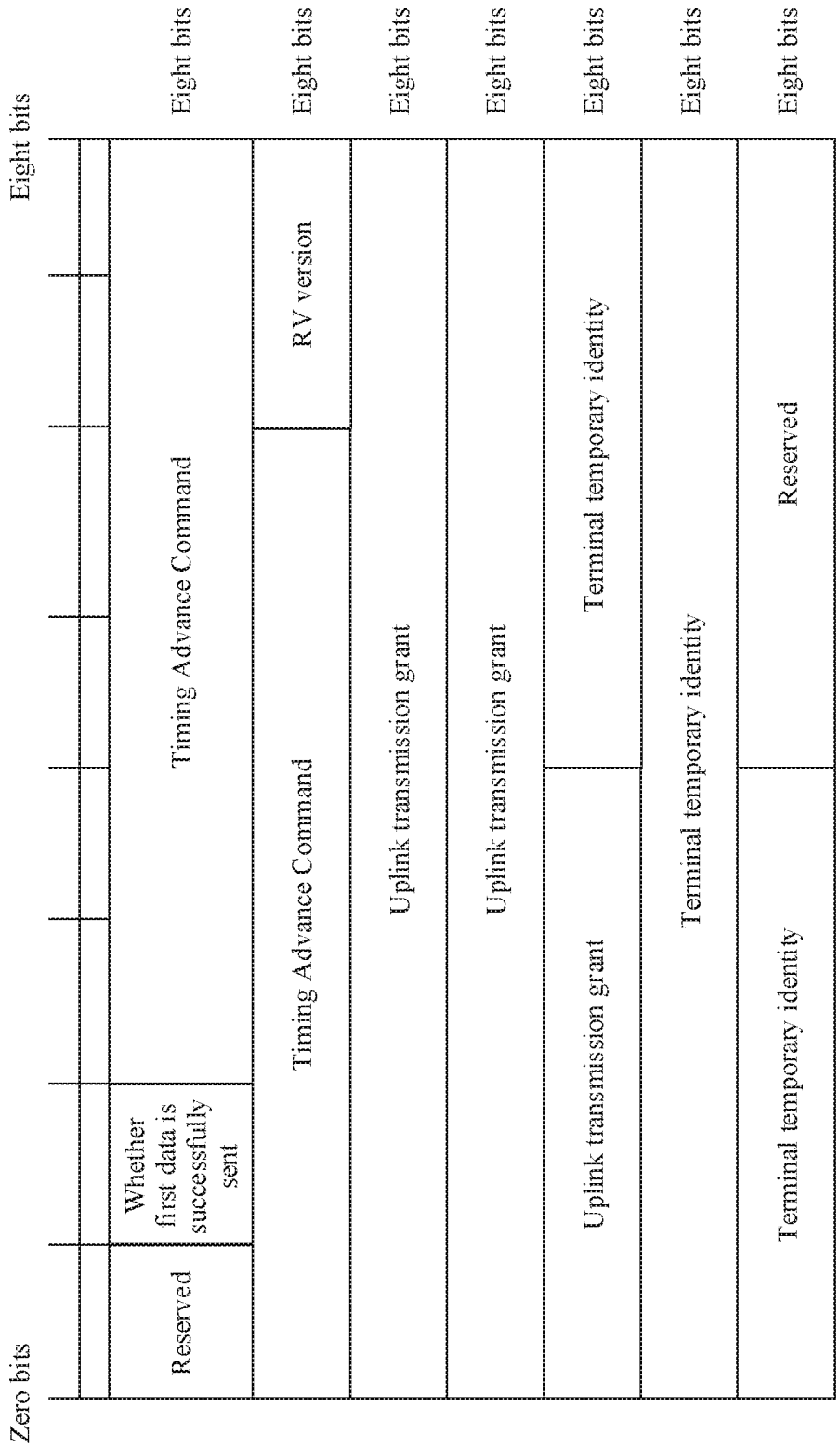

FIG. 4A is used as an example for description. FIG. 4A is a schematic diagram in which the terminal device does not receive a 2-step RAR in a RAR window. As shown in FIG. 4A, the terminal device sends, by using the first message, the first random access preamble and the first data whose first redundancy version number is an RV 0. The terminal device receives a response message in a random access response window (RAR window). That the first data fails is indicated in the response message. The response message is different from a response message in LTE, and may be considered as a specific response message in a 2-step random access procedure, namely, a random access response for 2-step (RAR for 2-step). The specific response message in the 2-step random access procedure is referred to as a "response message" for short in the embodiments of this application. FIG. 6A and FIG. 6B are schematic diagrams of two formats of the random access response for 2-step. The response message includes one field (the second bit shown in FIG. 6A and FIG. 6B), used to indicate whether the first data is successfully sent. For example, "1" indicates that the first data is sent successfully, and "0" indicates that the first data fails to be sent. Alternatively, on the contrary, "0" indicates that the first data is successfully sent, and "1" indicates that the first data fails to be sent.

After receiving the random access response for 2-step, the terminal device determines that the first data fails to be sent, and the terminal device retransmits the first data whose redundancy version number is an RV 1. Redundancy version numbers of the RV 1 and the RV 0 are different.

Figure 3B:
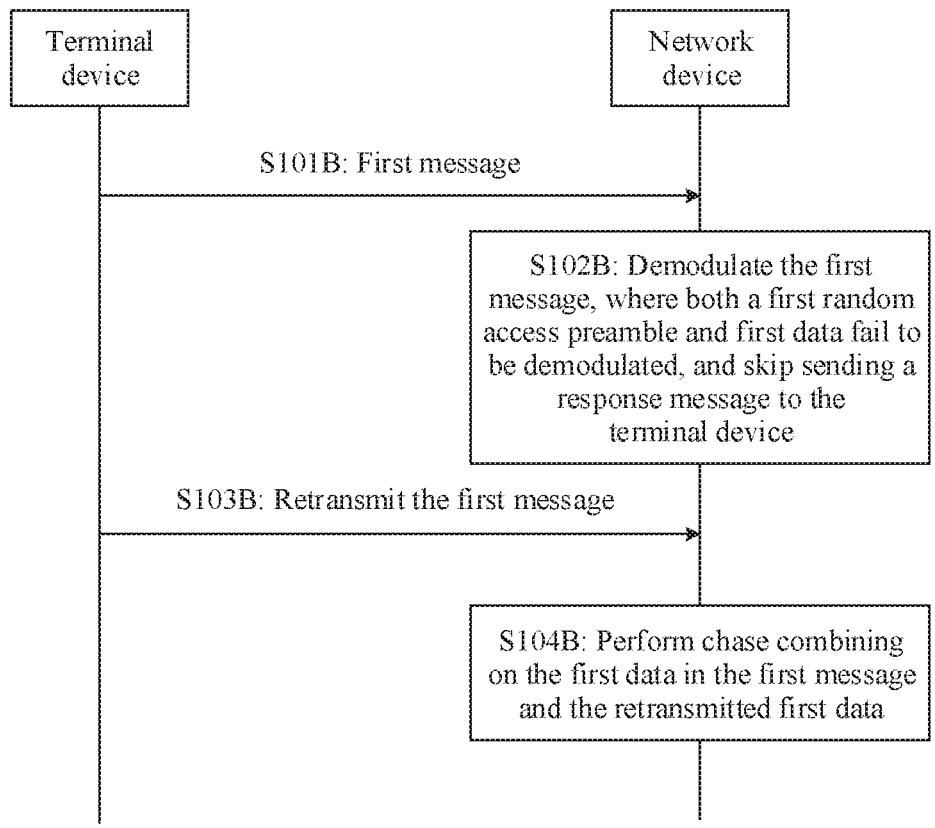
FIG. 3B is a schematic interaction flowchart of another communication method according to an embodiment of this application.

FIG. 3B is a schematic interaction flowchart of another communication method according to an embodiment of this application. The method may include the following steps.

S101B: A terminal device sends a first message to a network device, where the first message includes a first random access preamble and first data, and a first redundancy version is used for the first data. The network device receives the first message from the terminal device.

S102B: The network device demodulates the first message, where both the first random access preamble and the first data fail to be demodulated. In this case, the network device does not send any response message to the terminal device.

S103B: When the terminal device does not receive a response message from the network device within a response message receiving window (RAR window), the terminal device determines that both the first random access preamble and the first data fail to be sent, and the terminal device retransmits the first message, where a second redundancy version is used for the first data in the retransmitted first message. The network device receives the first data and a second random access preamble that are retransmitted by the terminal device.

S104B: The network device performs chase combining on the first data in the first message and the retransmitted first data.

This embodiment describes a random access procedure that is when both the first random access preamble and the first data fail to be sent.

Figure 4B:
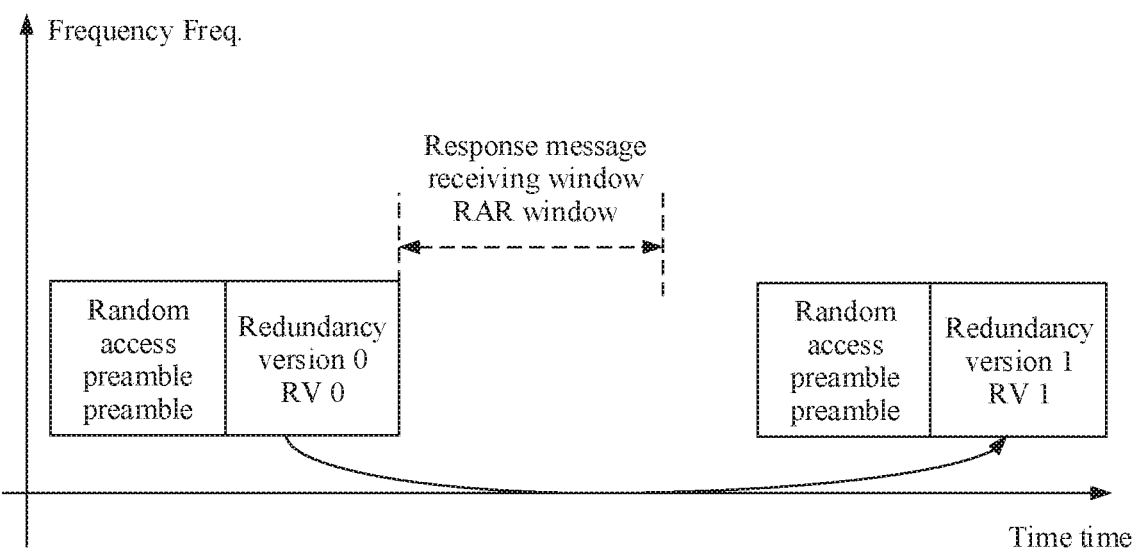
FIG. 4B is a schematic diagram in which a terminal device receives a 2-step RAR in a RAR window.

FIG. 4B is used as an example for description. FIG. 4B is a schematic diagram in which the terminal device receives a 2-step RAR in the RAR window. As shown in FIG. 4B, the terminal device sends, by using the first message, the first random access preamble and the first data whose redundancy version number is an RV 0. The terminal device does not receive any response message within the RAR window. In this case, the terminal device retransmits the second random access preamble and the first data whose redundancy version number is an RV 1. Redundancy version numbers of the RV 1 and the RV 0 are different. The second random access preamble may be the same as or different from the first random access preamble.

In the embodiments shown in FIG. 3A and FIG. 3B, a 2-step RACH is used. To be specific, the terminal device sends the first message, where the first message includes the message 1 (the first random access preamble) and the message 3 (the first data) in the 4-step RACH. The first random access preamble and the first data in the first message may be sent in manners shown in FIG. 5A to FIG. 5D.

Figure 5A:
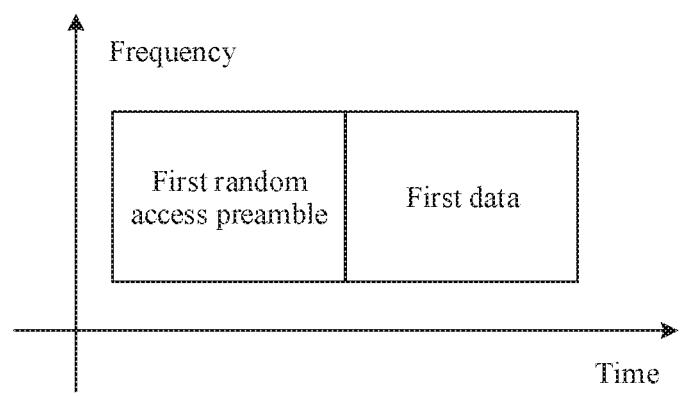
FIG. 5A to FIG. 5D each are a schematic diagram of a manner of sending a first message.
Figure 5B:
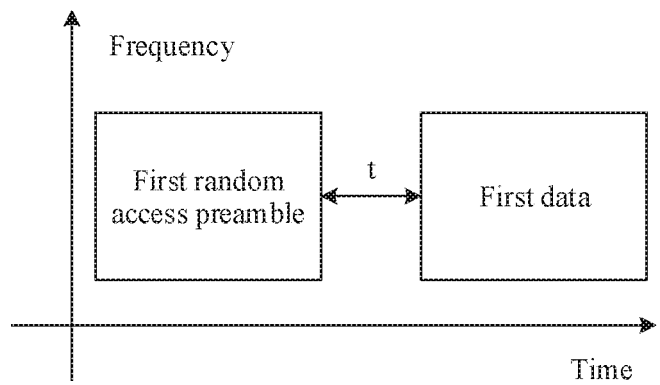

In a manner, as shown in FIG. 5A and FIG. 5B, the first random access preamble and the first data are sent in a time division multiplexing (TDM) manner. Optionally, as shown in FIG. 5A, the first random access preamble and the first data may be adjacent in terms of time. Alternatively, as shown in FIG. 5B, there is a time interval t between the first random access preamble and the first data in terms of time. A bandwidth of the first random access preamble may be greater than or equal to a bandwidth of the first data. In addition, when the first random access preamble is adjacent to the first data in time domain, the first random access preamble may be used as a demodulation reference signal of the first data.

Figure 5C:
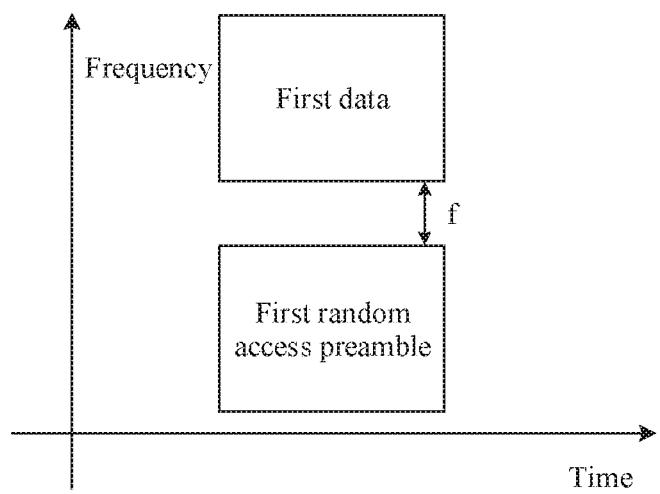
Figure 5D:
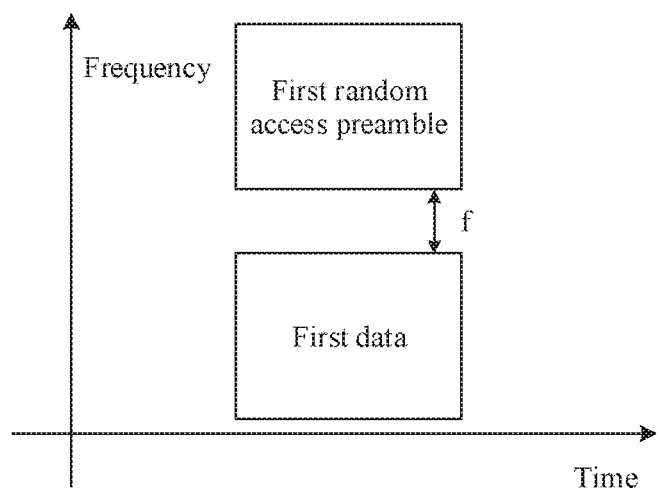

In another manner, as shown in FIG. 5C and FIG. 5D, the first random access preamble and the first data are sent in a frequency division multiplexing (FDM) manner. As shown in FIG. 5C, a frequency band for sending the first random access preamble is higher than a frequency band for sending the first data. Alternatively, as shown in FIG. 5D, a frequency band for sending the first data is higher than a frequency band for sending the first random access preamble. The first random access preamble and the first data may occupy same time domain duration. There may be a frequency interval f between the first data and the first random access preamble as a guard interval.

In the embodiments shown in FIG. 3A and FIG. 3B, the first data is retransmitted in an incremental redundancy manner. In the incremental redundancy sending manner, original information is encoded into a plurality of sets, each set is a bit set including same information, and each redundancy version is obtained by removing some information output by an encoder. The first data may include a plurality of redundancy versions. During initial transmission, the first redundancy version is used for the first data. During retransmission, the second redundancy version is used for the first data. It should be noted that the first redundancy version used during initial transmission and the second redundancy version used during retransmission merely indicate that redundancy version numbers are different, and do not have other special meanings. "First" and "second" do not represent actual version numbers of the redundancy versions. In addition, a different redundancy version may be used during each retransmission. For example, the second redundancy version is used during the first retransmission, and a third redundancy version is used during the second retransmission.

Further, in the embodiment shown in FIG. 3A or FIG. 3B, the method further includes: determining, by the terminal device, the second redundancy version.

The terminal device may determine the second redundancy version in several implementations that are not limited to the following implementations used as examples:

An implementation is determining a redundancy version of the first data based on a random access preamble sent by the terminal device. In this case, the determining, by the terminal device, the second redundancy version specifically includes: grouping, by the terminal device, a plurality of random access preambles, where each group includes at least one random access preamble, and each of the at least one random access preamble in the group corresponds to one redundancy version; and using, by the terminal device, a redundancy version corresponding to the second random access preamble as the second redundancy version.

During specific implementation, terminal devices use different random access preamble groups. For example, if a quantity of preambles associated with each random access occasion is N, for example, N=64, a quantity of redundancy versions that may be selected by the terminal device is n, and for example, n=4, the random access preambles are grouped into M groups, where M=floor(N/n), for example, 16 groups. Different terminal devices select, at an equal probability, one group of random access preambles from the M groups to initiate random access, and a quantity of n random access preambles in each group corresponds to different redundancy versions, for example, 0, 1, 2, and 3, as shown in Table 1A to Table 1C below:

TABLE 1A

Random access preamble groups and a correspondence between the random access preamble groups and redundancy versions of first data

| Random access preamble group | Random access preamble number | Corresponding redundancy version number |
|---|---|---|
| 0 | 0-3 | 0, 1, 2, and 3 |
| 1 | 4-7 | 0, 1, 2, and 3 |
| 2 | 8-11 | 0, 1, 2, and 3 |
| ... | ... | 0, 1, 2, and 3 |
| 15 | 60-63 | 0, 1, 2, and 3 |

It should be understood that another equivalent grouping manner may be used above. The N random access preambles are grouped into n groups, and a quantity of random access preambles in each group is k_i, where i=0, 1, . . . , or n−i. For example, an $i^{th}$ redundancy version corresponds to/is associated with an $i^{th}$ random access preamble group. Optionally, k_i random access preambles in the $i^{th}$ group are consecutive, as shown in Table 1B (four redundancy versions correspond to four random access preamble groups). Optionally, k_i random access preambles in the $i^{th}$ group are nonconsecutive, as shown in Table 1C (four redundancy versions correspond to four random access preamble groups). RV_0 to RV-3 in the table represent four redundancy versions.

TABLE 1B

Random access preamble groups and a correspondence between the random access preamble groups and redundancy versions of first data

| Random access preamble group | Random access preamble number | Corresponding redundancy version number |
|---|---|---|
| 0 | 0, 1, . . ., and 15 | RV_0 |
| 1 | 16, 17, . . ., and 31 | RV_1 |
| 2 | 32, 33, . . ., and 47 | RV_2 |
| 3 | 48, 49, . . ., and 63 | RV_3 |

TABLE 1C

Preamble groups and a correspondence between the preamble groups and redundancy versions of first data

| Random access preamble group | Random access preamble number | Corresponding redundancy version number |
|---|---|---|
| 0 | 4 × j, j = 0, 1, . . ., 15 | RV_0 |
| 1 | 4 × j + 1, j = 0, 1, . . ., 15 | RV_1 |
| 2 | 4 × j + 2, j = 0, 1, . . ., 15 | RV_2 |
| 3 | 4 × j + 3, j = 0, 1, . . ., 15 | RV_3 |

The terminal device and the network device may pre-store the table. The terminal device selects a random access preamble with a specific number in the group for each retransmission, and the network device can obtain, through parsing, a redundancy version number corresponding to the first data sent by the terminal device. After receiving random access preamble sequences from a same group, the network device considers that the random access preamble sequences are from a same terminal device, and performs chase combining on the received first data based on redundancy version numbers.

Moreover, in addition to the manners shown in the foregoing tables, for another example, after detecting a random access preamble, the network device may alternatively perform chase combining on the first data by using an RV as a redundancy version number of a data part same as U=[RAPID/4], where the RV is obtained according to a formula RV=mod(RAPID, 4). The RAPID (random access preamble id) is a random access preamble index. In this implementation, the network device is notified of a redundancy version of the retransmitted first data in an implicit indication manner without increasing additional overheads.

In another implementation, the terminal device sends a demodulation reference signal (DMRS) reference sequence c(n), so that the network device can obtain, through parsing, a redundancy version number of the first data sent by the terminal device. In this case, the determining, by the terminal device, the second redundancy version specifically includes: sending, by the terminal device to the network device, information used to identify a redundancy version, where the information used to identify the redundancy version is an initialization sequence of a demodulation reference signal (DMRS).

During specific implementation, the terminal device sends c(n) to the network device.

c(n) is generated according to the following formulas:

$c(n) = x_1(n+N_c) + x_2(n+N_c)) \bmod 2$ $x_1(n+31) = (x_1(n+3) + x_1(n)) \bmod 2$ $x_2(n+31) = (x_2(n+3) + x_2(n+2) + x_2(n+1) + x_2(n)) \bmod 2$ where Nc=1600, the first m-sequence x1(n+31) is obtained by initializing $x_1(0)=1$, $x_1(n)=0, n=1, 2, \ldots, 30$ and the second sequence x2(n+31) is obtained based on the initialization sequence $C_{init}$ of the demodulation reference signals.

The initialization sequence $C_{init}$ of the demodulation reference signals of the terminal device is:

$$c_{init}=(2^{17}(14n_s+1)+RV*2^{11}+cellId) \bmod 2^{31}$$

where $n_s$ is a slot index within a system frame/a slot index within a random access configuration periodicity, l is an index of a symbol within one slot, RV represents numbers of different redundancy versions, and cellId represents a cell identity.

It can be learned that $C_{init}$ identifies information about the redundancy version, and the network device may obtain a redundancy version of the first data by parsing c(n).

Likewise, in this implementation, the network device is notified of the redundancy version of the retransmitted first data in an implicit indication manner without increasing additional overheads.

Figure 7:
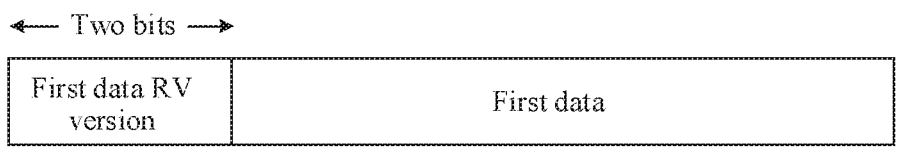
FIG. 7 is a schematic diagram of indicating a redundancy version in first data.

In still another implementation, the terminal device directly indicates the second redundancy version in the first data. For example, two additional bits are added to the first data to indicate values of four redundancy versions 0 to 3. For example, in a schematic diagram of a format of the first data shown in FIG. 7, the first two bits of the first data are used to indicate the redundancy version of the retransmitted first data. Alternatively, the last two bits of the first data are used to indicate the redundancy version of the retransmitted first data. In this implementation, the terminal device directly indicates the redundancy version of the retransmitted first data. The manner is easy to implement.

In still another implementation, the terminal device sends redundancy versions in a fixed version order, for example, 0-1-2-3 or 0-2-3-1. In this case, the determining, by the terminal device, the second redundancy version specifically includes: determining, by the terminal device in an order of the redundancy versions, a redundancy version for retransmitting the first data each time. The network device performs chase combining on the received first data in the fixed version order. In this implementation, using the redundancy versions in the fixed order is easy to implement.

In still another implementation, for the embodiment shown in FIG. 3A, the response message further includes information for indicating the second redundancy version. As shown in FIG. 4A, the network device sends the response message to the terminal device, where the response message includes information for indicating a redundancy version to be used by the terminal device to retransmit the first data next time. Further, the response message may further include at least one of the following information: a time resource and/or a frequency resource, a timing advance, or a terminal temporary identity for retransmitting the first data. During specific implementation, the response message may also have a plurality of formats, as shown in FIG. 6A and FIG. 6B.

A base station may indicate the redundancy version of the retransmitted first data in the response message. As shown in FIG. 6A, the third and fourth bits are used to indicate the redundancy version to be used for a next retransmission of the first data. After receiving the response message, the terminal device retransmits the first data on a next random access transmission occasion based on the redundancy version, of the first data, indicated by the network device. Further, the time resource and/or the frequency resource (located in an uplink transmission grant field) used to retransmit the first data may be further indicated in the response message. After receiving a RAR, the terminal device retransmits the first data at a corresponding time resource location and/or a corresponding frequency resource location. Further, the terminal temporary identity used to retransmit the first data may be further indicated in the response message. As shown in FIG. 6B, the $15^{th}$ and the $16^{th}$ bits are used to indicate the redundancy version to be used for a next retransmission of the first data. In FIG. 6B, a timing advance command field of the response message further includes the timing advance. After receiving the response message, the terminal device sends, based on the corresponding timing advance, the first data corresponding to the redundancy version at a corresponding time resource location and/or a corresponding frequency resource location. The timing advance is applied to a subsequent operation, so that in addition to uplink transmission, uplink channel synchronization can be further implemented.

In still another implementation, in the embodiment shown in FIG. 3A or FIG. 3B, the method may further include: retransmitting, by the terminal device, the first message to the network device, where the first message carries information for indicating the second redundancy version. In this implementation, the retransmitted first message is used to carry information for indicating a redundancy version of the retransmitted first data, to facilitate obtaining redundancy version information through parsing.

The network device receives the first data retransmitted by the terminal device, and performs chase combining on the first data sent by using the first message and the retransmitted first data. Because the terminal device sends the first data in the incremental redundancy manner, if a redundancy version used during each transmission is different, data received by the network device each time includes information different from data received last time. The network device performs chase combining on the first data that is received for a plurality of times, so that a possibility of successful demodulation is increased.

According to the communication method provided in this embodiment of this application, the incremental redundancy manner is used in a retransmission procedure of random access data, so that data transmission reliability is improved, and a latency of a random access procedure is further reduced.

In addition, for the case 4 (to be specific, the message 1 fails to be received, and the message 3 is successfully received) mentioned in the background, in an implementation, after the terminal device sends the first preamble and the first data, the network device successfully receives the first data, but fails to receive the first preamble. In this case, the network device may ignore the first data, and this is equivalent to a case in which both the first data and the first preamble fail to be sent.

In another implementation, after the terminal device sends the first preamble and the first data, the network device successfully receives/demodulates the first data, but fails to demodulate the first preamble. In this case, the network device indicates, to the terminal device by using a response message, DCI, or RRC, that the first data is successfully received in the random access procedure.

The first data includes one or more of a terminal identity, a RAPID, a random access transmission occasion (RACH transmission occasion, RO) index, a RA-RNTI, or to-be-transmitted data of the message 3.

The embodiments of this application further provide a communication method and a communications apparatus. A power at which a first random access preamble is retransmitted and/or a power at which first data is retransmitted are/is ramped up, so that retransmission reliability of the first random access preamble and/or the first data is improved, and a latency of a random access procedure is further reduced.

Figure 8A:
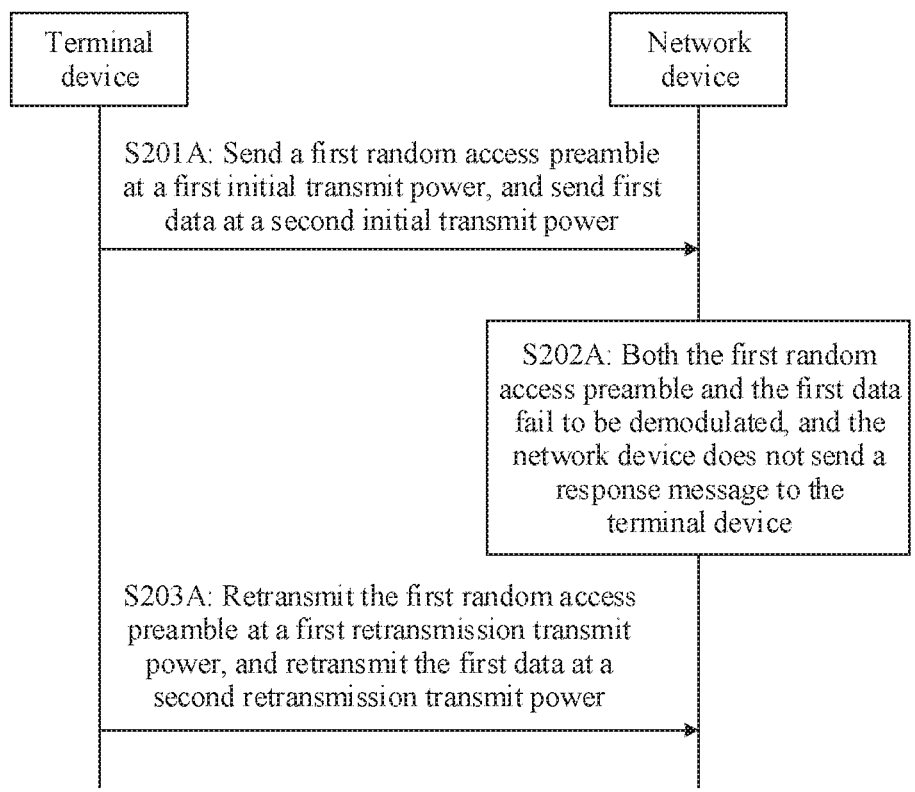
FIG. 8A is a schematic interaction flowchart of still another communication method according to an embodiment of this application.

FIG. 8A is a schematic interaction flowchart of still another communication method according to an embodiment of this application. The method may include the following steps.

S201A: A terminal device sends a first random access preamble to a network device at a first initial transmit power, and sends first data to the network device at a second initial transmit power, where the first initial transmit power is greater than or equal to the second initial transmit power. The network device receives the first random access preamble and the first data.

S202A: The network device demodulates the first random access preamble and the first data, where the first random access preamble fails to be demodulated, and the first data fails to be demodulated. The network device does not send a response message to the terminal device.

S203A: The terminal device retransmits the first random access preamble at a first retransmission transmit power, and retransmits the first data at a second retransmission transmit power. The network device receives the first random access preamble retransmitted by the terminal device at the first retransmission transmit power and the first data retransmitted by the terminal device at the second retransmission transmit power.

The first retransmission transmit power is a sum of the first initial transmit power and a first power ramping amount. The second retransmission transmit power is a sum of the second initial transmit power and a second power ramping amount. The first power ramping amount is a product of a first power ramping step and a first quantity of times of power ramping. The second power ramping amount is a product of a second power ramping step and a second quantity of times of power ramping. The first power ramping step is greater than or equal to the second power ramping step.

Figure 8B:
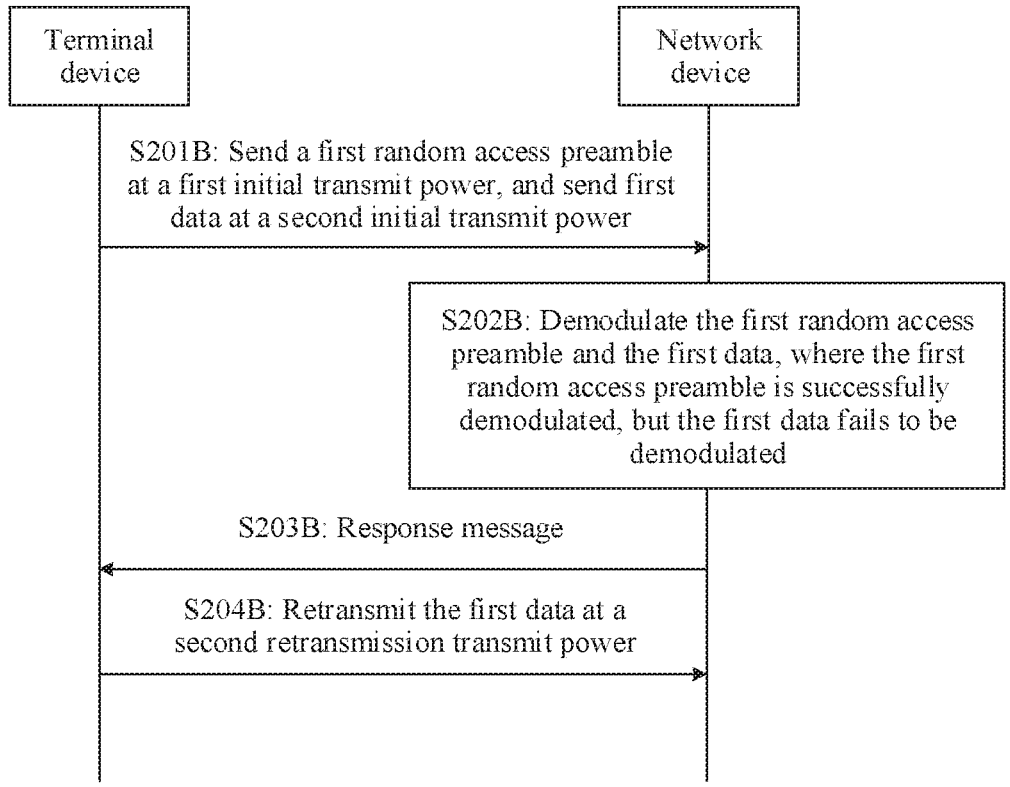
FIG. 8B is a schematic interaction flowchart of a communication method according to an embodiment of this application.

FIG. 8B is a schematic interaction flowchart of still another communication method according to an embodiment of this application. The method may include the following steps.

S201B: A terminal device sends a first random access preamble to a network device at a first initial transmit power, and sends first data to the network device at a second initial transmit power, where the first initial transmit power is greater than or equal to the second initial transmit power. The network device receives the first random access preamble and the first data.

S202B: The network device demodulates the first random access preamble and the first data, where the first random access preamble is successfully demodulated, but the first data fails to be demodulated.

S203B: The network device sends a response message to the terminal device.

S204B: The terminal device retransmits the first data at a second retransmission transmit power. The network device receives the first data retransmitted by the terminal device at the second retransmission transmit power.

The second retransmission transmit power is a sum of the second initial transmit power and a second power ramping amount. The second power ramping amount is a product of a second power ramping step and a second quantity of times of power ramping.

In the embodiments, a 2-step RACH is used. The first random access preamble refers to the message 1 in the 4-step RACH, and the first data refers to the message 3 in the 4-step RACH. The first random access preamble and the first data may be sent in the manners shown in FIG. 5A to FIG. 5D. For details, refer to the foregoing descriptions. To improve a possibility that the first random access preamble is successfully received and demodulated, the initial transmit power for sending the first random access preamble may be set to be greater than or equal to the initial transmit power for sending the first data.

Figure 9:
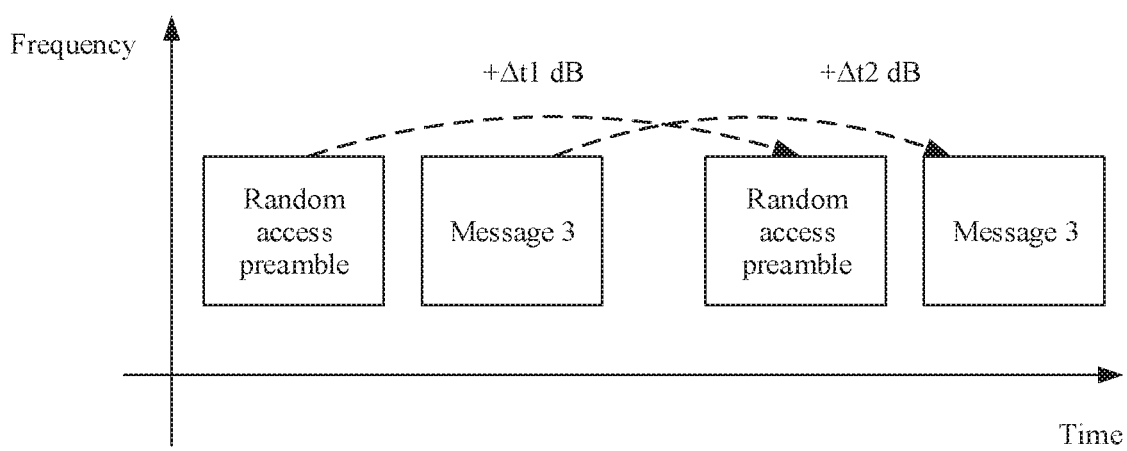
FIG. 9 is a schematic diagram of retransmission power ramping of a random access preamble and a message 3.

In the embodiments, transmit power ramping is performed when the first random access preamble and/or the first data are/is retransmitted. Specifically, for the embodiment shown in FIG. 8A, both the first random access preamble and the first data are not successfully received by the network device. In this case, the first random access preamble and the first data need to be retransmitted, and transmit power ramping may be performed for both the first random access preamble and the first data. For the embodiment shown in FIG. 8B, the network device successfully receives and demodulates the first random access preamble, but the first data fails to be received and/or demodulated. In this case, the first data is retransmitted, and transmit power ramping is performed on the first data. Specifically, as shown in a schematic diagram of retransmission power ramping of the first random access preamble and the first data in FIG. 9, the transmit power for retransmitting the first random access preamble is ramped up by Δt1 dB compared with the transmit power for initially transmitting the first random access preamble, and the transmit power for retransmitting the first data is ramped up by Δt2 dB compared with the transmit power for initially transmitting the first data.

A power ramping amount is a product of a power ramping step and a quantity of times of power ramping. The quantity of times of power ramping may be a specified value. Quantity of times of power ramping of the first random access preamble and the first data may be the same, or may be different.

In an implementation, the first power ramping step is greater than or equal to the second power ramping step. Therefore, during retransmission, if the quantity of times of power ramping of the first random access preamble and the first data are the same, and the first power ramping step is greater than or equal to the second power ramping step, the ramping amount of the first retransmission transmit power for retransmitting the first random access preamble is greater than or equal to that of the second retransmission transmit power for retransmitting the first data. For example, during retransmission, any power ramping configuration shown in Table 2 may be used:

TABLE 2

Example of a power ramping step configuration of a first random access preamble and first data

| Configuration | Configuration 1 | Configuration 2 | Configuration 3 | Configuration 4 |
|---|---|---|---|---|
| Power ramping step of the first random access preamble | 0 dB | 2 dB | 4 dB | 6 dB |
| Power ramping step of the first data | 0 dB | 1 dB | 2 dB | 3 dB |

In this implementation, ramping of the first retransmission transmit power for retransmitting the first random access preamble is greater than or equal to the second retransmission transmit power for retransmitting the first data, so that a probability that the first random access preamble is successfully received and demodulated can be increased.

In another implementation, because different random access preambles are orthogonal to each other, a probability that the first random access preamble is successfully demodulated is greater than a probability that the first data is successfully demodulated under a same condition. If the first data fails to be demodulated, the network device may choose to fall back to a 4-step RACH procedure. Therefore, during retransmission, the power ramping step of the first random access preamble may be less than the power ramping step of the first data. To be specific, a larger retransmission transmit power is used for the first data, to increase a one-time success probability of the first data. For example, during retransmission, any power ramping step configuration shown in Table 3 may be used:

TABLE 3

Example of another power ramping step configuration of a first random access preamble and first data

| Configuration | Configuration 1 | Configuration 2 | Configuration 3 | Configuration 4 |
|---|---|---|---|---|
| Power ramping step of the first data | 0 dB | 2 dB | 4 dB | 6 dB |
| Power ramping step of the first random access preamble | 0 dB | 1 dB | 2 dB | 3 dB |

In still another implementation, the first random access preamble and the first data may have different initial transmit powers. For example, the initial transmit power of the first random access preamble is 3 db greater than the initial transmit power of the first data. During subsequent power ramping, the first random access preamble and the first data may maintain same power ramping steps, so that a transmit power of the first random access preamble is always greater than that of the first data, to improve a detection success probability of the first random access preamble.

In still another implementation, the first random access preamble and the first data may have different initial transmit powers. For example, the initial transmit power of the first random access preamble is 3 db less than the initial transmit power of the first data. During subsequent power ramping, the first random access preamble and the first data may maintain same power ramping steps, so that a transmit power of the first data is always greater than that of the first random access preamble, to improve a detection success probability of the first data.

Further, in the embodiment shown in FIG. 8A or FIG. 8B, the method may further include: sending, by the network device to the terminal device, information for indicating a maximum quantity of transmissions and/or a maximum quantity of times of power ramping. The terminal device receives the indication information. Specifically, the indication information may be sent by using any one of remaining minimum system information (remaining minimum system information, RMSI), radio resource control (radio resource control, RRC) signaling, a system broadcast message, and a random access parameter configuration message. The terminal device retransmits the first random access preamble and/or the first data based on the indication information, to ensure that a quantity of times of initial transmission and retransmission does not exceed the maximum quantity of transmissions, or a quantity of times of power ramping does not exceed the maximum quantity of times of power ramping.

According to the communication method provided in this embodiment of this application, the power at which the first random access preamble is retransmitted and/or the power at which the first data is retransmitted are/is ramped up, so that retransmission reliability of the first random access preamble and/or the first data is improved, and a latency of a random access procedure is further reduced.

In addition, the 2-step RACH is not only used to implement a fast random access procedure, but also may be applied to a beam recovery request (beam failure recovery request, BFR) scenario. The network device configures one or more downlink signals for the terminal device. Each downlink signal is associated with one or more random access occasions (RACH occasion, RO) for the 2-step RACH. The downlink signal may be a channel state information reference signal CSI-RS, a demodulation reference signal DMRS, a phase tracking reference signal PTRS, or a synchronization/physical broadcast signal block SS/PBCH block. The RO may be understood as a time-frequency resource that is allocated by the network device to the terminal device and that is used for an uplink.

An implementation solution to sending random access configuration information is: The network device indicates, by using one or more of downlink control information (DCI), radio resource control (RRC) signaling, RMSI, a physical broadcast channel (PBCH), or a system message, the terminal device to perform at least one of the following configuration information of the 2-step RACH: an RO, a random access preamble, a redundancy version of data, a sending order, and a used initial transmit power or a used ramped power. The terminal device performs a 2-step RACH transmission procedure based on the configuration information.

For retransmission after a failure, one or a combination of a plurality of solutions in this application may be used. Details are not described herein again.

In addition, the terminal device selects a random access preamble, a random access occasion set, or a redundancy version based on a set of available random access preambles configured by the network device and a set of random access occasion configured by the network device. A transmit power and the redundancy version may be indicated by using one or a combination of the plurality of solutions in this application. Details are not described herein again.

In addition, the redundancy version is implicitly indicated by using a time-frequency location/an index of a random access resource/random access occasion. In a manner, an RO index is cyclically associated with the redundancy version, for example, as shown in Table 4:

TABLE 4

Association between a redundancy version and an RO index

| Downlink signal (using a CSI-RS as an example) | RO associated with the downlink signal | Redundancy version |
|---|---|---|
| CSI-RS 0 | RO 0-RO 3 | RV 0-RV 3 |
|  | RO 4-RO 7 | RV 0-RV 3 |
| CSI-RS 1 | RO 0-RO 3 | RV 0-RV 3 |
|  | RO 4-RO 7 | RV 0-RV 3 |
| . . . | . . . | . . . |

For example, the network device configures a downlink CSI-RS 0 and a downlink CSI-RS 1 for the terminal device, where the CSI-RS 0 and the CSI-RS 1 each are associated with eight ROs. In this case, the RO 0 to the RO 3 are associated with the RV 0 to the RV 3, and the RO 4 to the RO 7 are associated with the RV 0 to the RV 3. The rest may be deduced by analogy.

In addition to the beam recovery request scenario, the 2-step RACH may be further applied to a scenario in which the terminal device sends a relatively small amount of data to the network device, for example, massive machine-type communications (massive machine type communication, mMTC). A threshold of a data volume is configured by the network device. When an amount of data that needs to be sent by the terminal device is less than the threshold, the data is sent in the 2-step RACH. Otherwise, the data is sent in the 4-step RACH or in another manner. An implementation of selecting a redundancy version is: The network device reserves, for the terminal device, K ROs used for the 2-step RACH, and the terminal device sends data by using a same redundancy version or different redundancy versions on the K ROs. A version indication method may be one or a combination of the several manners in this application. Optionally, one or a combination of the several transmit power ramping methods in this application may be used for the K times of redundant transmission.

In addition to the foregoing scenario, the 2-step RACH may be further applied to a scenario in which the terminal device sends data having a specific priority to the network device. Classification/a priority of data is determined by the network device and/or the terminal device, or is predefined. One implementation of selecting whether to use the 2-step RACH is to determine, based on a latency of to-be-sent data/a reliability requirement, whether to use the 2-step RACH. For example, another implementation of selecting whether to use the 2-step RACH is: The network device/the terminal device predefines a threshold, and performs 2-step random access on data having a requirement for an access latency less than 50 ms. Alternatively, for data having a requirement for reliability greater than 99.99%, the base station configures K downlink signals for the terminal device, and each downlink signal is associated with one or more random access occasions. A corresponding redundancy version may be sent or indicated in one or a combination of several manners in this application. Optionally, one or a combination of the several transmit power ramping methods in this application may be used for a plurality of times of redundant transmission.

Figure 10:
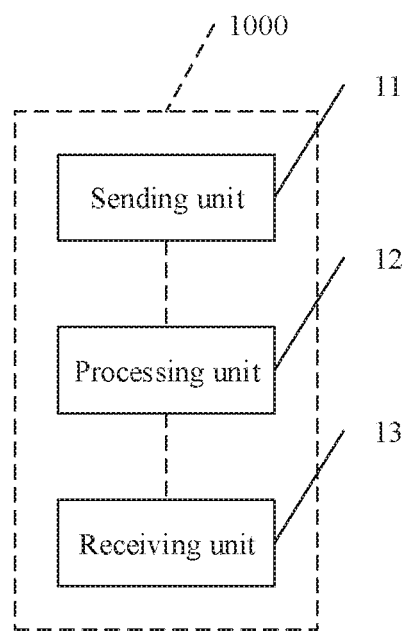
FIG. 10 is a schematic structural diagram of a communications apparatus according to an embodiment of this application.

FIG. 10 is a schematic structural diagram of a communications apparatus according to an embodiment of this application. The apparatus 1000 may include a sending unit 11, a processing unit 12, and a receiving unit 13.

The sending unit 11 is configured to send a first message to a network device, where the first message includes a first random access preamble and first data, and a first redundancy version is used for the first data.

The processing unit 12 is configured to determine that the first data fails to be sent.

The sending unit 11 is further configured to retransmit the first data, where the first data is retransmitted by using a second redundancy version.

The processing unit 12 is configured to: when the apparatus 1000 does not receive a response message from the network device within a response message receiving window, determine that the first data fails to be sent.

The processing unit 12 is configured to: when the apparatus 1000 receives, from the network device, a response message that carries information for indicating that the first data fails, determine that the first data fails to be sent.

The processing unit 12 is further configured to: when the terminal device does not receive the response message from the network device within the response message receiving window, determine that the first random access preamble fails to be sent.

The sending unit 11 is further configured to send a second random access preamble to the network device, where the second random access preamble is different from the first random access preamble.

The processing unit 12 is further configured to determine the second redundancy version.

The processing unit 12 is further configured to: group a plurality of random access preambles, where each group includes at least one random access preamble, and each of the at least one random access preamble in the group corresponds to one redundancy version; and use a redundancy version corresponding to the second random access preamble as the second redundancy version.

The sending unit 11 is further configured to send, to the network device, information used to identify a redundancy version, where the information used to identify the redundancy version is an initialization sequence of a demodulation reference signal DMRS.

The initialization sequence of the demodulation reference signal DMRS is:

$$c_{init}=(2^{17}(14n_s+1)+RV*2^{11}+cellId) \mod 2^{31}$$

where $n_s$ is a slot index within a system frame/a slot index within a random access configuration periodicity, l is an index of a symbol within one slot, RV represents numbers of different redundancy versions, and cellId represents a cell identity.

The response message includes information about the second redundancy version.

The response message further includes at least one of the following information: a time resource and/or a frequency resource, a timing advance, or a terminal temporary identity for retransmitting the first data.

The sending unit 11 is further configured to retransmit the first message to the network device, where the first message carries information for indicating the second redundancy version.

The communications apparatus 1000 provided in this application corresponds to the method embodiment in FIG. 3A or FIG. 3B, and all descriptions of the method embodiment are applicable to the communications apparatus. According to the communications apparatus provided in this embodiment of this application, an incremental redundancy manner is used in a retransmission procedure of random access data, so that data transmission reliability is improved, and a latency of a random access procedure is further reduced.

Figure 11:
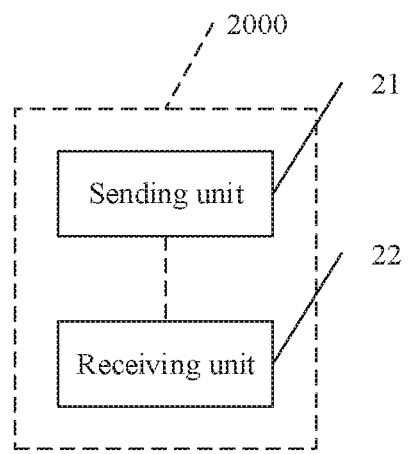
FIG. 11 is a schematic structural diagram of another communications apparatus according to an embodiment of this application.

FIG. 11 is a schematic structural diagram of another communications apparatus according to an embodiment of this application. The apparatus 2000 may include a sending unit 21 and a receiving unit 22.

The sending unit 21 is configured to: send a first random access preamble to a network device at a first initial transmit power, and send first data to the network device at a second initial transmit power, where the first initial transmit power is greater than or equal to the second initial transmit power.

The sending unit 21 is further configured to retransmit the first random access preamble at a first retransmission transmit power, and/or retransmit the first data at a second retransmission transmit power.

The first retransmission transmit power is a sum of the first initial transmit power and a first power ramping amount, the second retransmission transmit power is a sum of the second initial transmit power and a second power ramping amount, the first power ramping amount is a product of a first power ramping step and a first quantity of times of power ramping, the second power ramping amount is a product of a second power ramping step and a second quantity of times of power ramping, and the first power ramping step is greater than or equal to the second power ramping step.

The receiving unit 22 is configured to receive, from the network device, information for indicating a maximum quantity of transmissions and/or a maximum quantity of times of power ramping.

The communications apparatus 2000 provided in this application corresponds to the method embodiment in FIG. 8A or FIG. 8B, and all descriptions of the method embodiment are applicable to the communications apparatus. According to the communications apparatus provided in this embodiment of this application, the power at which the first random access preamble is retransmitted and/or the power at which the first data is retransmitted are/is ramped up, so that retransmission reliability of the first random access preamble and/or the first data is improved, and a latency of a random access procedure is further reduced.

The communications apparatuses in FIG. 10 and FIG. 11 in this application may be terminal devices, or may be chips or integrated circuits installed in terminal devices.

Figure 12:
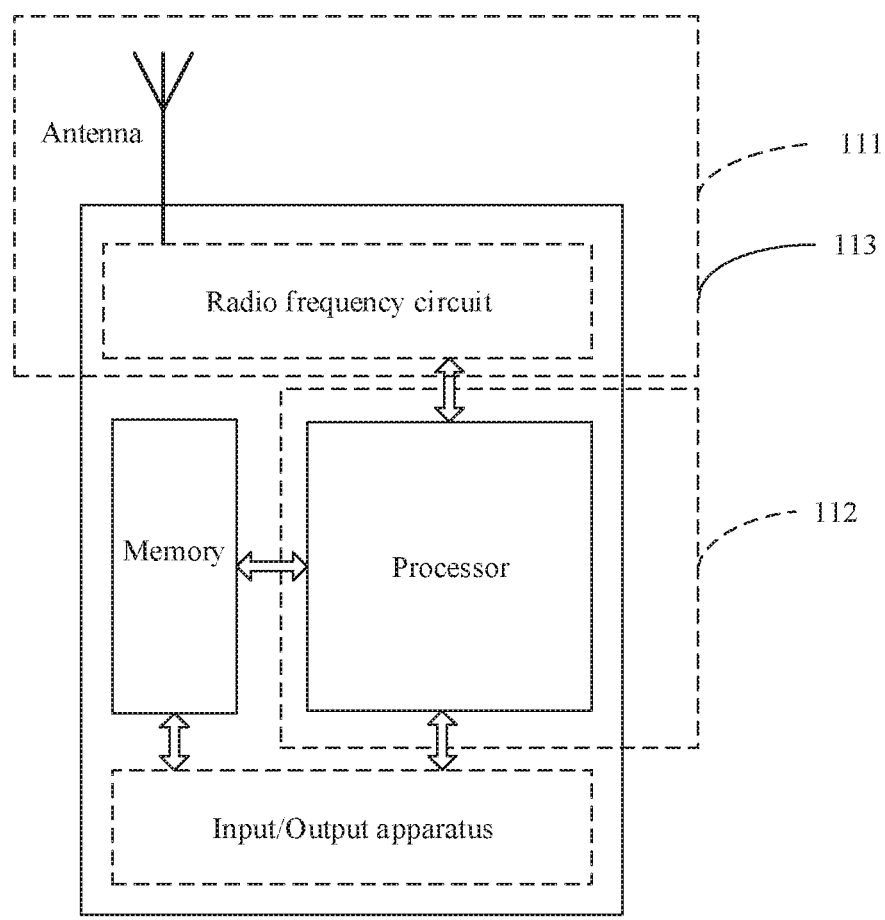
FIG. 12 is a simplified schematic structural diagram of a terminal device.

For example, the communications apparatus is a terminal device. FIG. 12 is a simplified schematic structural diagram of the terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to process a communication protocol and communication data, control the terminal device, execute a software program, process data of the software program, and so on. The memory is mainly configured to store the software program and data. The radio frequency circuit is mainly configured to perform conversion between a baseband signal and a radio frequency signal, and process the radio frequency signal. The antenna is mainly configured to send and receive a radio frequency signal in an electromagnetic wave form. The input/output apparatus, such as a touchscreen, a display, or a keyboard, is mainly configured to receive data input by a user and data output to the user. It should be noted that some types of terminal devices may not have the input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal in an electromagnetic wave form by using the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a receiving unit and a sending unit (which may also be collectively referred to as a transceiver unit) of the terminal device, and the processor having a processing function may be considered as a processing unit of the terminal device. As shown in FIG. 12, the terminal device includes a receiving unit 111, a processing unit 112, and a sending unit 113. The receiving unit 111 may also be referred to as a receiver, a receiver, a receiving circuit, and the like. The sending unit 113 may also be referred to as a transmitter, a transmitter, a transmitter, a transmitting circuit, and the like. The processing unit may also be referred to as a processor, a processing board, a processing module, a processing apparatus, and the like.

For example, in an embodiment, the sending unit 113 is configured to perform steps S101A and S104A in the embodiment shown in FIG. 3A, and the receiving unit 111 is configured to perform step S103A in the embodiment shown in FIG. 3A.

For example, in another embodiment, the sending unit 113 is configured to perform steps S101B and S103B in the embodiment shown in FIG. 3B.

For example, in still another embodiment, the sending unit 113 is configured to perform steps S201A and S203A in the embodiment shown in FIG. 8A.

For example, in still another embodiment, the sending unit 113 is configured to perform steps S201B and S204B in the embodiment shown in FIG. 8B, and the receiving unit 111 is configured to perform step S203B in the embodiment shown in FIG. 8B.

An embodiment of this application further provides a communications apparatus. The communications apparatus is configured to perform the foregoing communication methods. Some or all of the foregoing communication methods may be implemented by hardware or software. When the hardware is used for implementation, in an embodiment, the communications apparatus includes: a transmitter, configured to send a first message to a network device, where the first message includes a first random access preamble and first data, and a first redundancy version is used for the first data; and a processor, configured to determine that the first data fails to be sent, where the transmitter is further configured to retransmit the first data, where the first data is retransmitted by using a second redundancy version. In another embodiment, the communications apparatus includes a transmitter, configured to send a first random access preamble to a network device at a first initial transmit power, and send first data to the network device at a second initial transmit power, where the first initial transmit power is greater than or equal to the second initial transmit power, and further configured to retransmit the first random access preamble at a first retransmission transmit power, and/or retransmit the second data at a second retransmission transmit power. The communications apparatus may further include a receiver and a processing circuit.

During specific implementation, the communications apparatus may be a chip or an integrated circuit.

When some or all of the communication methods in the foregoing embodiments are implemented by using the software, the communications apparatus includes: a memory, configured to store a program; and a processor, configured to execute the program stored in the memory, so that when the program is executed, the communications apparatus is enabled to implement the communication methods provided in the foregoing embodiments.

The memory may be a physically independent unit, or may be integrated with the processor.

When some or all of the communication methods in the foregoing embodiments are implemented by using the software, the communications apparatus may alternatively include only a processor. A memory configured to store a program is located outside the communications apparatus. The processor is connected to the memory by using a circuit/wire, and is configured to read and execute the program stored in the memory.

The processor may be a central processing unit (CPU), a network processor (NP), or a combination of a CPU and an NP.

The processor may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory may include a volatile memory such as a random-access memory (RAM); the memory may include a non-volatile memory such as a flash memory, a hard disk drive (HDD), or a solid-state drive (SSD); or the memory may include a combination of the foregoing types of memories.

Figure 13A:
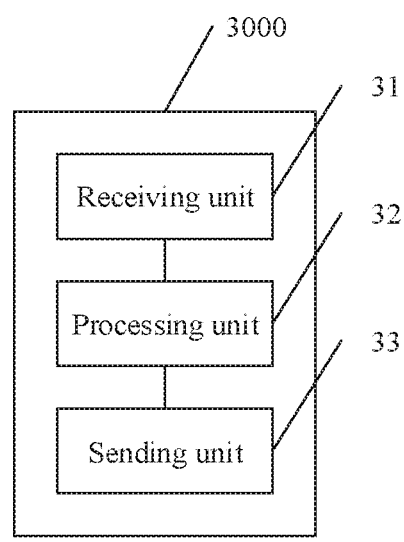
FIG. 13A is a schematic structural diagram of still another communications apparatus according to an embodiment of this application.

FIG. 13A is a schematic structural diagram of still another communications apparatus according to an embodiment of this application. The apparatus 3000 may include a receiving unit 31, a processing unit 32, and a sending unit 33.

The receiving unit 31 is configured to receive a first message from a terminal device, where the first message includes a first random access preamble and first data, and a first redundancy version is used for the first data.

The processing unit 32 is configured to demodulate the first message.

The sending unit 33 is configured to send a response message when the first data fails to be demodulated, where the response message carries information for indicating that the first data fails.

The receiving unit 31 is further configured to receive the first data retransmitted by the terminal device, where a second redundancy version is used for the retransmitted first data.

The processing unit 32 is further configured to perform chase combining on the first data in the first message and the retransmitted first data.

The communications apparatus 3000 provided in this application corresponds to the method embodiment in FIG. 3A, and all descriptions of the method embodiment are applicable to the communications apparatus. According to the communications apparatus provided in this embodiment of this application, an incremental redundancy manner is used in a retransmission procedure of random access data, so that data transmission reliability is improved, and a latency of a random access procedure is further reduced.

Figure 13B:
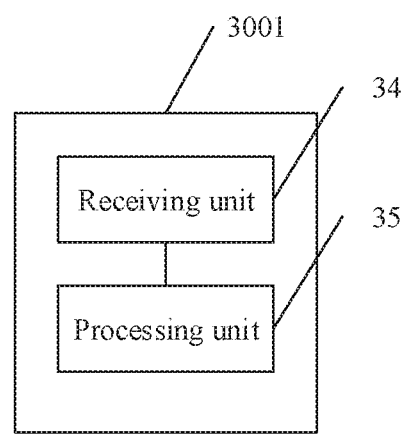
FIG. 13B is a schematic structural diagram of still another communications apparatus according to an embodiment of this application.

FIG. 13B is a schematic structural diagram of still another communications apparatus according to an embodiment of this application. The apparatus 3001 may include a receiving unit 34 and a processing unit 35.

The receiving unit 34 is configured to receive a first message from a terminal device, where the first message includes a first random access preamble and first data, and a first redundancy version is used for the first data.

The processing unit 35 is configured to demodulate the first message.

The processing unit 35 is further configured to skip, when the first message fails to be demodulated, sending any message to the terminal device.

The receiving unit 34 is further configured to receive the first message retransmitted by the terminal device, where a second redundancy version is used for the first data in the retransmitted first message.

The processing unit 35 is further configured to perform chase combining on the first data in the first message and the retransmitted first data.

The communications apparatus 3001 provided in this application corresponds to the method embodiment in FIG. 3B, and all descriptions of the method embodiment are applicable to the communications apparatus. According to the communications apparatus provided in this embodiment of this application, an incremental redundancy manner is used in a retransmission procedure of random access data, so that data transmission reliability is improved, and a latency of a random access procedure is further reduced.

Figure 14A:
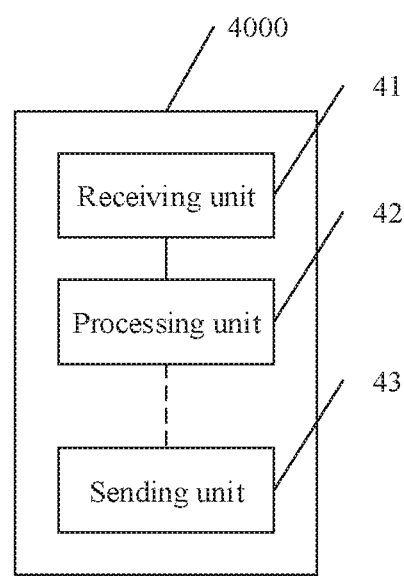
FIG. 14A is a schematic structural diagram of still another communications apparatus according to an embodiment of this application.

FIG. 14A is a schematic structural diagram of still another communications apparatus according to an embodiment of this application. The apparatus 4000 may include a receiving unit 41, a processing unit 42, and a sending unit 43.

The receiving unit 41 is configured to receive a first random access preamble sent by a terminal device at a first initial transmit power and first data sent by the terminal device at a second initial transmit power, where the first initial transmit power is greater than or equal to the second initial transmit power.

The processing unit 42 is configured to demodulate the first random access preamble and the first data.

The processing unit 42 is further configured to: if the first random access preamble fails to be demodulated and the first data fails to be demodulated, skip sending a response message to the terminal device.

The receiving unit 41 is further configured to receive the first random access preamble retransmitted by the terminal device at a first retransmission transmit power and the first data retransmitted by the terminal device at a second retransmission transmit power.

The first retransmission transmit power is a sum of the first initial transmit power and a first power ramping amount, the second retransmission transmit power is a sum of the second initial transmit power and a second power ramping amount, the first power ramping amount is a product of a first power ramping step and a first quantity of times of power ramping, the second power ramping amount is a product of a second power ramping step and a second quantity of times of power ramping, and the first power ramping step is greater than or equal to the second power ramping step.

The sending unit 43 is configured to send, to the terminal device, information for indicating a maximum quantity of transmissions and/or a maximum quantity of times of power ramping.

The communications apparatus 4000 provided in this application corresponds to the method embodiment in FIG. 8A, and all descriptions of the method embodiment are applicable to the communications apparatus. According to the communications apparatus provided in this embodiment of this application, the power at which the first random access preamble is retransmitted and the power at which the first data is retransmitted are ramped up, so that retransmission reliability of the first random access preamble and the first data is improved, and a latency of a random access procedure is further reduced.

Figure 14B:
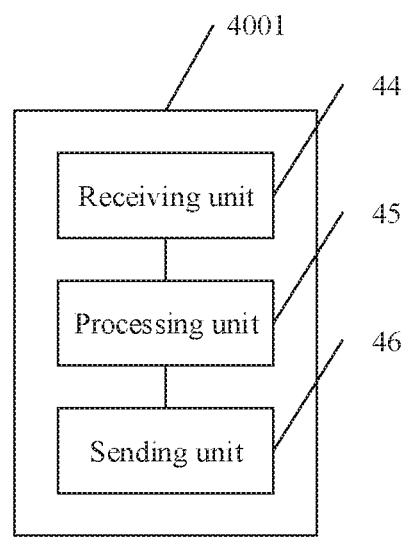
FIG. 14B is a schematic structural diagram of still another communications apparatus according to an embodiment of this application.

FIG. 14B is a schematic structural diagram of still another communications apparatus according to an embodiment of this application. The apparatus 4001 may include a receiving unit 44, a processing unit 45, and a sending unit 46.

The receiving unit 44 is configured to receive a first random access preamble sent by a terminal device at a first initial transmit power and first data sent by the terminal device at a second initial transmit power, where the first initial transmit power is greater than or equal to the second initial transmit power.

The processing unit 45 is configured to demodulate the first random access preamble and the first data.

The sending unit 46 is configured to send a response message to the terminal device if the first random access preamble is successfully demodulated and the first data fails to be demodulated.

The receiving unit 41 is further configured to receive the first data retransmitted by the terminal device at a second retransmission transmit power.

The second retransmission transmit power is a sum of the second initial transmit power and a second power ramping amount. The second power ramping amount is a product of a second power ramping step and a second quantity of times of power ramping.

The sending unit 46 is further configured to send, to the terminal device, information for indicating a maximum quantity of transmissions and/or a maximum quantity of times of power ramping.

The communications apparatus 4001 provided in this application corresponds to the method embodiment in FIG. 8B, and all descriptions of the method embodiment are applicable to the communications apparatus. According to the communications apparatus provided in this embodiment of this application, the power at which the first data is retransmitted is ramped up, so that retransmission reliability of the first data is improved, and a latency of a random access procedure is further reduced.

In this application, the communications apparatuses shown in FIG. 13A, FIG. 13B, FIG. 14A, and FIG. 14B may be network devices, or may be chips or integrated circuits installed in network devices.

Figure 15:
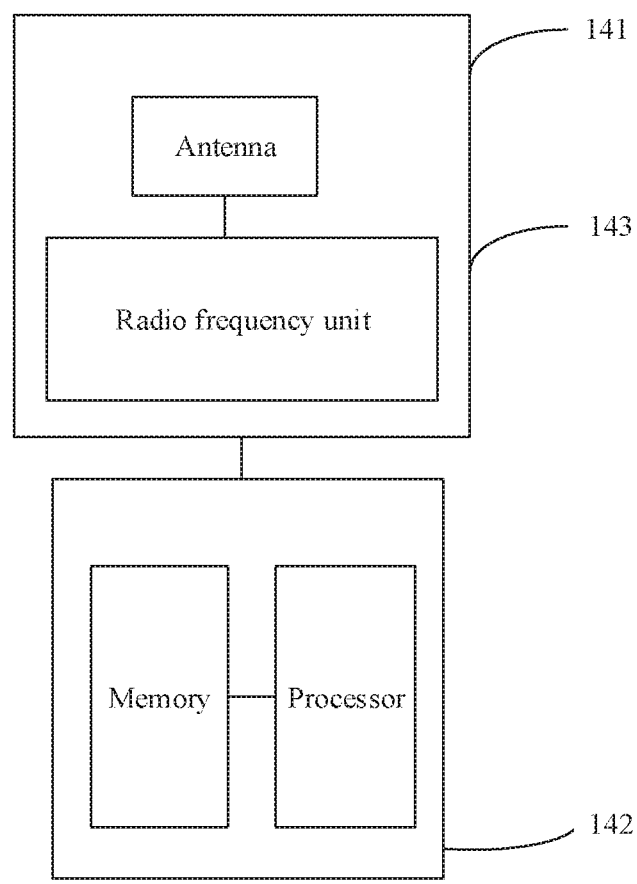
FIG. 15 is a simplified schematic structural diagram of a network device.

For example, the communications apparatus is a network device. FIG. 15 is a simplified schematic structural diagram of the network device. The network device includes a part 142 and a part for sending and receiving a radio frequency signal and performing conversion. The part for sending and receiving a radio frequency signal and performing conversion further includes a receiving unit part 141 and a sending unit part 143 (which may also be collectively referred to as a transceiver unit). The part for sending and receiving a radio frequency signal and performing conversion is mainly configured to: send and receive a radio frequency signal and perform conversion between a radio frequency signal and a baseband signal. The part 142 is mainly configured to perform baseband processing, control the network device, and so on. The receiving unit 141 may also be referred to as a receiver, a receiver, a receiving circuit, and the like. The sending unit 143 may also be referred to as a transmitter, a transmitter, a transmitter, a transmitting circuit, and the like. The part 142 is usually a control center of the network device, may be usually referred to as a processing unit, and is configured to control the network device to perform the steps performed by the network device in FIG. 3A or FIG. 3B. For details, refer to the foregoing descriptions of the related parts.

The part 142 may include one or more boards. Each board may include one or more processors and one or more memories. The processor is configured to read and execute a program in the memory to implement a baseband processing function and control the network device. If there are a plurality of boards, the boards may be interconnected to enhance a processing capability. In an optional implementation, alternatively, the plurality of boards may share one or more processors, the plurality of boards share one or more memories, or the plurality of boards simultaneously share one or more processors.

For example, in an embodiment, the receiving unit 141 is configured to perform step S101A in the embodiment shown in FIG. 3A, the processing unit 142 is configured to perform steps S102A and S105A in the embodiment shown in FIG. 3A, and the sending unit 143 is configured to perform step S103A in the embodiment shown in FIG. 3A.

For example, in another embodiment, the receiving unit 141 is configured to perform steps S101B and S103B in the embodiment shown in FIG. 3B, and the processing unit 142 is configured to perform steps S102B and S104B in the embodiment shown in FIG. 3B.

For example, in still another embodiment, the receiving unit 141 is configured to perform steps S201A and S203A in the embodiment shown in FIG. 8A, and the processing unit 142 is configured to perform step S202A in the embodiment shown in FIG. 8A.

For example, in still another embodiment, the receiving unit 141 is configured to perform steps S201B and S204B in the embodiment shown in FIG. 8B, the processing unit 142 is configured to perform step S202B in the embodiment shown in FIG. 8B, and the sending unit 143 is configured to perform step S203B in the embodiment shown in FIG. 8B.

An embodiment of this application further provides a communications apparatus. The communications apparatus is configured to perform the foregoing communication methods. Some or all of the foregoing communication methods may be implemented by hardware or software. When the hardware is used for implementation, in an embodiment, the communications apparatus includes: a receiver, configured to receive a first message from a terminal device, where the first message includes a first random access preamble and first data, and a first redundancy version is used for the first data; a processor, configured to demodulate the first message, where the first random access preamble is successfully demodulated, and the first data fails to be demodulated; and a transmitter, configured to send a response message to the terminal device, where the response message carries information for indicating that the first data fails. The receiver is further configured to receive the first data retransmitted by the terminal device, where a second redundancy version is used for the retransmitted first data. The processor is further configured to perform chase combining on the first data in the first message and the retransmitted first data. In another embodiment, the communications apparatus includes: a receiver, configured to receive a first message from a terminal device, where the first message includes a first random access preamble and first data, and a first redundancy version is used for the first data; and a processor, configured to demodulate the first message, where the first random access preamble fails to be demodulated, and the first data fails to be demodulated. The processor is further configured to skip sending any message to the terminal device. The receiver is further configured to receive the first random access preamble and the first data that are retransmitted by the terminal device. The processor is further configured to perform chase combining on the first data in the first message and the retransmitted first data. In still another embodiment, the communications apparatus includes: a receiver, configured to receive a first random access preamble sent by a terminal device at a first initial transmit power and first data sent by the terminal device at a second initial transmit power; and a processor, configured to demodulate the first random access preamble and the first data. The processor is further configured to: if the first random access preamble fails to be demodulated and the first data fails to be demodulated, skip sending a response message to the terminal device. The receiver is further configured to receive the first random access preamble retransmitted by the terminal device at a first retransmission transmit power and the first data retransmitted by the terminal device at a second retransmission transmit power. In still another embodiment, the communications apparatus includes: a receiver, configured to receive a first random access preamble sent by a terminal device at a first initial transmit power and first data sent by the terminal device at a second initial transmit power; a processor, configured to demodulate the first random access preamble and the first data; and a transmitter, configured to send a response message to the terminal device if the first random access preamble is successfully demodulated and the data fails to be demodulated. The receiver is further configured to receive the first data retransmitted by the terminal device at a second retransmission transmit power.

During specific implementation, the communications apparatus may be a chip or an integrated circuit.

When some or all of the communication methods in the foregoing embodiments are implemented by using the software, the communications apparatus includes: a memory, configured to store a program; and a processor, configured to execute the program stored in the memory, so that when the program is executed, the communications apparatus is enabled to implement the communication methods provided in the foregoing embodiments.

The memory may be a physically independent unit, or may be integrated with the processor.

When some or all of the communication methods in the foregoing embodiments are implemented by using the software, the communications apparatus may alternatively include only a processor. A memory configured to store a program is located outside the communications apparatus. The processor is connected to the memory by using a circuit/wire, and is configured to read and execute the program stored in the memory.

The processor may be a CPU, an NP, or a combination of a CPU and an NP.

The processor may further include a hardware chip. The hardware chip may be an ASIC, a PLD, or a combination thereof. The PLD may be a CPLD, an FPGA, a GAL, or any combination thereof.

The memory may include a volatile memory such as a RAM; the memory may include a non-volatile memory such as a flash memory, a hard disk drive, or a solid-state drive; or the memory may include a combination of the foregoing types of memories.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, method, and apparatus may be implemented in another manner. For example, the apparatus embodiment described above is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, each of the units may exist alone physically, or two or more units are integrated into one unit.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instruction may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (solid state disk, SSD)), or the like.

A person of ordinary skill in the art may understand that all or some of the procedures of the methods in the embodiments may be implemented by a computer program instructing relevant hardware. The program may be stored in a computer-readable storage medium. When the program is executed, the procedures of the method embodiments may be performed. The foregoing storage medium includes: any medium that can store program code, such as a read-only memory (ROM), a random access memory (RAM), a magnetic disk, or an optical disc.

What is claimed is:

1. A communication method, performed by a terminal device or a chip for the terminal device, comprising:
    in a 2-step random access procedure, sending a first random access preamble to a network device at a first initial transmit power, and sending first data to the network device at a second initial transmit power, wherein the first random access preamble and the first data are comprised in a first message of the 2-step random access procedure; and
    in the 2-step random access procedure, retransmitting the first random access preamble at a first retransmission transmit power, and retransmitting the first data at a second retransmission transmit power in response to no response received during a reception window after sending the first message,
    wherein the first retransmission transmit power is a first sum of the first initial transmit power and a first power ramping amount, the second retransmission transmit power is a second sum of the second initial transmit power and a second power ramping amount, the first power ramping amount is a first product of a first power ramping step and a first quantity of times of power ramping, the second power ramping amount is a second product of a second power ramping step and a second quantity of times of power ramping, and the first power ramping step for calculating the first retransmission transmit power used in the 2-step random access procedure is equal to the second power ramping step for calculating the second retransmission transmit power used in the 2-step random access procedure, and
    wherein the first power ramping step for calculating the first retransmission transmit power used in the 2-step random access procedure is equal to the second power ramping step for calculating the second retransmission transmit power used in the 2-step random access procedure such that the first retransmission transmit power is different from the second retransmission transmit power.

2. The communication method according to claim 1, wherein the method further comprises:
    receiving, from the network device, information indicating a maximum quantity of transmissions or a maximum quantity of times of power ramping.

3. The communication method according to claim 1, wherein the first initial transmit power is smaller than the second initial transmit power.

4. The communication method according to claim 1, wherein the first quantity of times of power ramping equals to the second quantity of times of power ramping.

5. The communication method according to claim 1, further comprising:
    receiving, from the network device, a response message; and
    in response to the response message, retransmitting the first data at a third retransmission transmit power.

6. The communication method according to claim 1, wherein the first random access preamble and the first data are sent in a time division multiplexing (TDM) manner.

7. The communication method according to claim 6, wherein the first data is sent at a second starting time after a first ending time at which the first random access preamble is sent, wherein there is a time gap between the first ending time and the second starting time.

8. The communication method according to claim 1, wherein the sending the first data comprises:
    sending the first data whose redundancy version (RV) is a first RV; and
    sending a first demodulation reference signal (DMRS) reference sequence for parsing the first RV, wherein the retransmitting the first data comprises:
    retransmitting the first data whose RV is a second RV different from the first RV; and
    sending a second DMRS reference sequence for parsing the second RV, and
    wherein the first initial transmit power is greater than the second initial transmit power.

9. An apparatus, comprising a processor, and a circuit for communication,
wherein the processor is configured to perform following:
in a 2-step random access procedure, sending a first random access preamble to a network device at a first initial transmit power, and sending first data to the network device at a second initial transmit power, wherein the first random access preamble and the first data are comprised in a first message of the 2-step random access procedure; and
in the 2-step random access procedure, retransmitting the first random access preamble at a first retransmission transmit power, and retransmitting the first data at a second retransmission transmit power in response to no response received by the apparatus during a reception window after sending the first message,
wherein the first retransmission transmit power is a first sum of the first initial transmit power and a first power ramping amount, the second retransmission transmit power is a second sum of the second initial transmit power and a second power ramping amount, the first power ramping amount is a first product of a first power ramping step and a first quantity of times of power ramping, the second power ramping amount is a second product of a second power ramping step and a second quantity of times of power ramping, and the first power ramping step for calculating the first retransmission transmit power used in the 2-step random access procedure is equal to the second power ramping step for calculating the second retransmission transmit power used in the 2-step random access procedure, and
wherein the first power ramping step for calculating the first retransmission transmit power used in the 2-step random access procedure is equal to the second power ramping step for calculating the second retransmission transmit power used in the 2-step random access procedure such that the first retransmission transmit power is different from the second retransmission transmit power.

10. The apparatus according to claim 9, wherein the processor is further configured to perform:
receiving, from the network device, information indicating a maximum quantity of transmissions or a maximum quantity of times of power ramping.

11. The apparatus according to claim 9, wherein the first initial transmit power is smaller than the second initial transmit power.

12. The apparatus according to claim 9, wherein the first quantity of times of power ramping equals to the second quantity of times of power ramping.

13. The apparatus according to claim 9, wherein the processor is further configured to perform:
receiving, from the network device, a response message; and
in response to the response message, retransmitting the first data at a third retransmission transmit power.

14. The apparatus according to claim 9, wherein the first random access preamble and the first data are sent in a time division multiplexing (TDM) manner.

15. The apparatus according to claim 14, wherein the first data is sent at a second starting time after a first ending time at which the first random access preamble is sent, wherein there is a time gap between the first ending time and the second starting time.

16. A communication system, comprising:
a terminal device, configured to perform:
in a 2-step random access procedure, sending a first random access preamble to a network device at a first initial transmit power, and sending first data to the network device at a second initial transmit power, wherein the first random access preamble and the first data are comprised in a first message of the 2-step random access procedure; and
in the 2-step random access procedure, retransmitting the first random access preamble at a first retransmission transmit power, and retransmitting the first data at a second retransmission transmit power in response to no response received by the terminal device during a reception window after sending the first message,
wherein the first retransmission transmit power is a first sum of the first initial transmit power and a first power ramping amount, the second retransmission transmit power is a second sum of the second initial transmit power and a second power ramping amount, the first power ramping amount is a first product of a first power ramping step and a first quantity of times of power ramping, the second power ramping amount is a second product of a second power ramping step and a second quantity of times of power ramping, and the first power ramping step for calculating the first retransmission transmit power used in the 2-step random access procedure is equal to the second power ramping step for calculating the second retransmission transmit power used in the 2-step random access procedure, and
wherein the first power ramping step for calculating the first retransmission transmit power used in the 2-step random access procedure is equal to the second power ramping step for calculating the second retransmission transmit power used in the 2-step random access procedure such that the first retransmission transmit power is different from the second retransmission transmit power; and
the network device, configured to:
receive the first random access preamble and the first data from the terminal device.

17. The communication system according to claim 16, wherein the terminal device is further configured to receive, from the network device, information indicating a maximum quantity of transmissions or a maximum quantity of times of power ramping; and
the network device is further configured to send the information indicating the maximum quantity of transmissions or the maximum quantity of times of power ramping.

18. The communication system according to claim 16, wherein the first initial transmit power is smaller than the second initial transmit power.

19. The communication system according to claim 16, wherein the first quantity of times of power ramping equals to the second quantity of times of power ramping.

20. The communication system according to claim 16, wherein the terminal device is further configured to:
receive, from the network device, a response message; and
in response to the response message, retransmit the first data at a third retransmission transmit power; and
the network device is further configured to send the response message.

21. The communication system according to claim 16, wherein the first random access preamble and the first data are sent in a time division multiplexing (TDM) manner.

22. The communication system according to claim 21, wherein the first data is sent at a second starting time after a first ending time at which the first random access preamble is sent, wherein there is a time gap between the first ending time and the second starting time.

* * * * *